United States Patent
Matsushima et al.

(10) Patent No.: US 7,934,256 B2
(45) Date of Patent: Apr. 26, 2011

(54) ELECTRONIC DEVICE, UPDATE SERVER DEVICE, KEY UPDATE DEVICE

(75) Inventors: Hideki Matsushima, Osaka (JP);
Takafumi Kagawa, Osaka (JP);
Tomoyuki Haga, Nara (JP); Hiroshi Okuyama, Osaka (JP); Shigehiko Kimura, Osaka (JP); Yasuki Oiwa, Osaka (JP); Yoshikatsu Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 757 days.

(21) Appl. No.: 11/914,918

(22) PCT Filed: May 30, 2006

(86) PCT No.: PCT/JP2006/310764
§ 371 (c)(1),
(2), (4) Date: Nov. 19, 2007

(87) PCT Pub. No.: WO2006/129654
PCT Pub. Date: Dec. 7, 2006

(65) Prior Publication Data
US 2009/0193521 A1 Jul. 30, 2009

(30) Foreign Application Priority Data
Jun. 1, 2005 (JP) ................................. 2005-161358

(51) Int. Cl.
*G06F 11/00* (2006.01)
*G06F 12/14* (2006.01)
*G06F 12/16* (2006.01)
*G08B 23/00* (2006.01)
(52) U.S. Cl. .............................. 726/22; 726/26; 713/165
(58) Field of Classification Search .................... 726/22, 726/26; 713/165
See application file for complete search history.

(56) References Cited

U.S. PATENT DOCUMENTS
6,026,293 A * 2/2000 Osborn ......................... 455/411
(Continued)

FOREIGN PATENT DOCUMENTS
JP 2001-500293 1/2001
(Continued)

OTHER PUBLICATIONS
International Search Report issued Jul. 11, 2006 in the International (PCT) Application of which the present application is the U.S. National Stage.

(Continued)

*Primary Examiner* — David García Cervetti
(74) *Attorney, Agent, or Firm* — Wenderoth, Lind & Ponack, L.L.P.

(57) ABSTRACT

The present invention offers an electronic device that reduces the amount of data for communication required when files pertaining to software are to be updated, as compared to the conventional devices, and performs tamper detection. The present invention is an electronic device having an application file pertaining to an operation of application software and updating the application file via a network. The electronic device (i) stores therein the application file including one or more data pieces, (ii) receives, from an external apparatus via the network, update data and location information indicating a location, within the application file, which is for rewrite with the update data, (iii) rewrites only part of the application file by writing over a data piece present at the indicated location with the update data, to update the application file, and (iv) examines whether the updated application file has been tampered with.

15 Claims, 23 Drawing Sheets

U.S. PATENT DOCUMENTS

| | | | |
|---|---|---|---|
| 6,191,701 B1* | 2/2001 | Bruwer | 340/5.22 |
| 6,453,383 B1* | 9/2002 | Stoddard et al. | 711/112 |
| 6,574,657 B1* | 6/2003 | Dickinson | 709/203 |
| 6,738,799 B2* | 5/2004 | Dickenson | 709/203 |
| 6,956,798 B2* | 10/2005 | Mitsuda et al. | 369/47.13 |
| 7,228,423 B2 | 6/2007 | Asai et al. | |
| 7,310,716 B2* | 12/2007 | Galipeau et al. | 711/162 |
| 7,337,309 B2* | 2/2008 | Nguyen et al. | 713/1 |
| 7,620,186 B2* | 11/2009 | Sozzani et al. | 380/277 |
| 7,624,269 B2* | 11/2009 | Appenzeller et al. | 713/171 |
| 7,711,896 B2* | 5/2010 | Yamamoto et al. | 711/113 |
| 2002/0046344 A1* | 4/2002 | Naito | 713/189 |
| 2002/0181732 A1* | 12/2002 | Safavi-Naini et al. | 382/100 |
| 2002/0194484 A1* | 12/2002 | Bolosky et al. | 713/189 |
| 2003/0023966 A1* | 1/2003 | Shimizu et al. | 717/175 |
| 2003/0193859 A1* | 10/2003 | Mitsuda et al. | 369/47.13 |
| 2003/0200207 A1* | 10/2003 | Dickinson | 707/3 |
| 2004/0193865 A1* | 9/2004 | Nguyen et al. | 713/2 |
| 2004/0268068 A1* | 12/2004 | Curran et al. | 711/162 |
| 2005/0091501 A1* | 4/2005 | Osthoff et al. | 713/181 |
| 2005/0102507 A1* | 5/2005 | Sozzani et al. | 713/165 |
| 2006/0010324 A1* | 1/2006 | Appenzeller et al. | 713/171 |
| 2006/0020747 A1* | 1/2006 | Estakhri et al. | 711/103 |
| 2006/0085860 A1* | 4/2006 | Zou et al. | 726/26 |
| 2006/0106888 A1* | 5/2006 | Iida et al. | 707/203 |
| 2006/0198517 A1* | 9/2006 | Cameron et al. | 380/44 |
| 2006/0200637 A1* | 9/2006 | Galipeau et al. | 711/162 |
| 2007/0106858 A1* | 5/2007 | Galipeau et al. | 711/162 |
| 2007/0165261 A1* | 7/2007 | Someya | 358/1.14 |
| 2007/0288914 A1* | 12/2007 | Brannock et al. | 717/169 |

FOREIGN PATENT DOCUMENTS

| | | |
|---|---|---|
| JP | 2002-16565 | 1/2002 |
| JP | 2005-18725 | 1/2005 |
| JP | 2005-515534 | 5/2005 |

OTHER PUBLICATIONS

Aucsmith et al., "Protecting Software Against Inverse Analysis and Tampering", Nikkei Electronics, No. 706, Jan. 1998 (including partial English translation).

Ishima et al., "Tamper Resistant Technology for Software", Fuji Xerox Technical Report, No. 13, 2000 (including English translation).

* cited by examiner

ELECTRONIC DEVICE, UPDATE SERVER DEVICE, KEY UPDATE DEVICE

TECHNICAL FIELD

The present invention relates to a technology for detecting tampering of software installed in an electronic device, by updating the software via a network.

BACKGROUND ART

Technologies for preventing unauthorized alteration and analyses of programs have been studied to this date. For example, Non-patent Reference 1 describes fundamental principles and specific methods for preventing software analyses. Additionally, Non-patent Reference 2 discusses technological issues and measures of TRCS (Tamper Resistant Coding System) developed as a tool for preventing software analyses. These technologies for preventing unauthorized software analyses and tampering are called "tamper resistant technologies". Hereinafter in this document, unauthorized alteration is simply referred to as "tampering" while authorized alteration is referred to as "updating".

Such tamper resistant technologies have already been in practical use. Software for playing commercially produced DVD contents on a PC is one example of them. DVD contents are encrypted to prevent illegal copying, and a decryption key is required in order to play back the contents. If malicious users obtain the decryption key, the DVD contents may be easily copied and wrongly distributed via the Internet. Therefore, the above-mentioned software is protected by tamper resistant technologies.

Thus, digital contents represented by DVDs have been widely disseminated in recent years, and tamper resistant technologies are indispensable for software that plays these digital contents on a computer or other systems whose specifications have been made public.

Tamper resistant technologies are also applied to electronic devices such as mobile phones. Patent Reference 1 discloses one of the tamper resistant technologies, a tamper detection method which uses a hash function to prevent tampering with main memory of electronic devices.

In addition, networking of electronic devices including mobile phones has been progressed in recent years, and accordingly, even if defects are found in software embedded in products after the shipment of the products, it has become possible to update the software by distributing software for correcting those defects via a network.

<Non-patent Reference 1> "Gyaku-kaiseki ya Kaihen kara Soft wo Mamoru (Protecting Software from Inverse Analyses and Tampering)" Nikkei Electronics, 1998. 1.5 (pp. 209-220)

<Non-patent Reference 2> "Software no Tai-tampering Technology (Software Tamper Resistant Technology)" Fuji Xerox Technical Report No. 13 (pp. 20-28)

<Patent Reference 1> Published Japanese Translation of PCT International Publication for Patent Application No. 2001-500293

<Patent Reference 2> Japanese Laid-Open Patent Application No. 2005-018725

SUMMARY OF THE INVENTION

Problems that the Invention is to Solve

In the case when an electronic device for tamper detection updates its software via a network, updated software itself is distributed to the electronic device via the network. Therefore, if the size of the updated software becomes larger, the electronic device requires more time to receive the updated software. That is, the increased time in updating the software leads to user dissatisfaction.

Given this factor, the present invention aims at offering: an electronic device that reduces the amount of data for communication required when files pertaining to software are to be updated as compared to the conventional devices, and performs tamper detection; an update server apparatus; a key update apparatus; an update method; an update program; and an obtaining method and an obtaining program that obtain information necessary for updating software.

Means to Solve the Problem

In order to realize the above object, the present invention is an electronic device having an application file pertaining to an operation of application software and updating the application file via a network. Here, the electronic device comprises: a storage unit storing therein the application file including one or more data pieces; a reception unit operable to receive, from an external apparatus via the network, update data and location information indicating a location in the application file, the indicated location being for rewrite with the update data; an update process unit operable to rewrite only part of the application file by writing over a data piece present at the indicated location with the update data, to update the application file; and a tamper detection execution unit operable to examine whether the updated application file has been tampered with.

Advantageous Effects of the Invention

According to the above structure, the electronic device receives, via the network, update data for data included in the application file and location information indicating a location, within the application file, which is for rewrite with the update data, and rewrites only part of the application file by writing over the data with the update data based on the received location information. Herewith, the amount of data for communication can be reduced as compared to the case of receiving an updated application file from an external apparatus.

Here, the reception unit may receive one or more updating sets, each of which includes the update data and the location information. In this case, the update process unit includes: a location determining subunit operable to determine, with respect to each of the updating sets, an update location in the application file based on the indicated location; a write subunit operable to write, with respect to each of the updating sets, the update data in a place starting from the determined update location; and an update control subunit operable to control the location determining subunit and the write subunit to be in process until completion of writing of the update data included in all the sets.

According to the structure, the electronic device can determine the writing start location for the update data based on a location indicated by the received location information and write the update data in the place starting from the determined writing start location.

Here, the update control subunit may control the tamper detection execution unit to start a process thereof when the writing of the update data included in all the updating sets is completed.

According to the structure, the electronic device is able to check whether the updated application file has been tampered with after the update of the application file, whereby assuring the validity of the updated application file.

Here, the update process unit may further include: a flag storage subunit storing therein a flag showing one of $1^{st}$ information indicating that the application file is in a process of update and $2^{nd}$ information indicating that the application file is not in the process of update; and a flag change subunit operable to change flag information shown by the flag. In this case, the flag change subunit changes the flag information to the $1^{st}$ information when the reception unit receives the updating sets, and changes the flag information to the $2^{nd}$ information when tampering is not detected by the tamper detection execution unit.

According to the structure, the electronic device is able to determine, by using the flag, whether the application file is in the process of being updated.

Here, the update control subunit may check the flag information when the electronic device is powered on, and control the location determining subunit and the write subunit to be in process in a case where the flag information is the $1^{st}$ information.

According to the structure, the electronic device restarts updating the application file in the case where the flag information is the $1^{st}$ information when the electronic device is powered on. Herewith, even if the power is turned off in the middle of the update of the application file, the electronic device is able to make sure of updating the application file later when the electronic device is powered on.

Here, the application file may be divided into one or more blocks. In this case, the update data is included in one or more update blocks, each of which corresponds to a different one of the divided blocks. The storage unit stores therein a tamper detection list including one or more reference tamper detecting values which correspond one-to-one with the divided blocks. The reception unit further receives one or more update block information sets, each of which corresponds to a different one of the update blocks and includes a new reference tamper detecting value and tamper detection location information indicating a location, in the tamper detection list, at which the new reference tamper detecting value is to be written. The update process unit further updates the tamper detection list using the update block information sets. Only when the updated tamper detection list is valid, the tamper detection execution unit examines whether a block subject to tamper detection has been tampered with, based on the reference tamper detecting values in the updated tamper detection list.

According to the structure, the electronic device checks the validity of the tamper detection list. Herewith, it is possible to prevent misconduct that tampers with the tamper detection value itself to thereby make invalid blocks misidentified as valid ones.

Here, the application file may be divided into one or more blocks. In this case, the storage unit stores therein a tamper detection list including one or more reference tamper detecting values which correspond one-to-one with the divided blocks. The tamper detection execution unit starts a process thereof at start-up of the application software, and examines, only when the tamper detection list is valid, whether a block subject to tamper detection has been tampered with, based on at least one of the reference tamper detecting values in the tamper detection list.

According to the structure, the electronic device checks the validity of the tamper detection list. Herewith, it is possible to prevent misconduct that tampers with the tamper detection value itself to thereby make invalid blocks misidentified as valid ones.

Here, the tamper detection unit may calculate a detection tamper detecting value for the block subject to the tamper detection, perform a judgment of whether the detection tamper detecting value matches a reference tamper detecting value corresponding to the block subject to the tamper detection, and determine that the updated application file has not been tampered with when the judgment is affirmative and determine that the updated application file has been tampered with when the judgment is negative.

According to the structure, the electronic device is able to check whether the block subject to the tamper detection has been tampered with, using the detection tamper detecting value for the block and the tamper detecting value corresponding to the block and included in the tamper detection list.

Here, the storage unit may store therein a partial key. In this case, the tamper detection execution unit is tamper resistant, stores therein a master key, generates a tamper detection key using the partial key and the master key, and uses the generated tamper detection key to calculate the detection tamper detecting value.

According to the structure, since the tamper detection execution unit is tamper resistant and stores therein a master key, the electronic device is able to generate a tamper detection key and prevent the generated tamper detection key from being analyzed by an unauthorized analyzer.

Here, the reception unit may receive a new partial key different from the partial key and key location information indicating a location, in the storage unit, at which the partial key is stored. In this case, the update process unit updates the partial key with the new partial key based on the key location information.

According to the structure, the electronic device is able to update the partial key. Herewith, the electronic device is able to generate a new tamper detection key by updating the partial key even if the tamper detection key becomes known to an unauthorized analyzer.

Here, the tamper detection list may be made up of a data part including the reference tamper detecting values and a header part including a reference data-part tamper detecting value corresponding to the data part. In this case, the tamper detection execution unit calculates a detection data-part tamper detecting value corresponding to the data part, and determines that the tamper detection list is valid in a case where the calculated detection data-part tamper detecting value matches the reference data-part tamper detecting value.

According to the structure, the electronic device is able to ensure the validity of the tamper detection list by checking the tamper detection value for the data part included in the tamper detection list. Herewith, it is possible to perform the tamper detection of the application file in a more accurate fashion.

Here, the data part may be encrypted. In this case, the tamper detection execution unit calculates the detection data-part tamper detecting value corresponding to the encrypted data part, and decrypts the encrypted data part in a case where the tamper detection list is valid.

According to the structure, since the data part has been encrypted, the electronic device can prevent the tamper detection value of each block included in the tamper detection list from becoming known to an unauthorized analyzer.

Here, in the tamper detection list, judgment information may be associated with each of the reference tamper detecting values and indicate whether a divided block corresponding to the reference tamper detecting value is to be used as the block subject to the tamper detection. In this case, the tamper detection execution unit does not perform the tamper detection on the divided block in a case when the associated judgment information indicates the divided block is not to be used as the block subject to the tamper detection.

According to the structure, the electronic device is able not to perform the tamper detection on a block in the case when the judgment information indicates the block is not to be used as the block subject to the tamper detection. Herewith, when some blocks become unnecessary as a result of the update of the application file, it is possible to omit the tamper detection for the unnecessary blocks.

Here, in the tamper detection list, an application type indicating a type of application software subject to the tamper detection may be associated with each of the reference tamper detecting values. In this case, the tamper detection execution unit examines whether the block subject to the tamper detection has been tampered with, based on one or more reference tamper detecting values associated with the application type indicating the type of started-up application software.

According to the structure, the electronic device is able to perform the tamper detection using one or more tamper detection values corresponding to the application type of the started application software.

Here, when the electronic device has a plurality of application files pertaining to the operation of the application software, each of the application files may be divided into one or more blocks. In this case, the tamper detection list stores therein, with respect to each of the application files, the reference tamper detecting values corresponding one-to-one with the divided blocks as a reference value group, and includes range information indicating a range of at least one reference value group among reference value groups for the respective application files, the at least one reference value group being used for the tamper detection performed at the start-up of the application software. The tamper detection execution unit examines whether the block subject to the tamper detection has been tampered with, using the at least one reference value group at the start-up of the application software.

According to the structure, the electronic device performs tamper detection on application files according to a priority order, using at least one reference value group indicated by the range information at the start-up of the application software. Herewith, it is possible to reduce the time required for starting the application software when compared to the case in which the tamper detection is performed with the use of all reference value groups.

Here, the update process unit and the tamper detection execution unit may be tamper resistant.

According to the structure, since the update process unit and the tamper detection execution unit are tamper resistant, the electronic device is able to prevent operations of the update process and the tamper detection from becoming known to an unauthorized analyzer.

In addition, the present invention is an update server apparatus causing, via a network, an electronic device to update an application file held by the electronic device and including one or more data pieces. The update server apparatus comprises: a $1^{st}$ obtaining unit operable to obtain the updated application file; a $2^{nd}$ obtaining unit operable to, from the obtained updated application file, update data and location information indicating a location in the application file in a pre-update state, the indicated location being for rewrite with the update data; and a transmitting unit operable to transmit the update data and the location information to the electronic device.

According to the structure, the update server apparatus obtains update data for data included in the application file and location information indicating a location, within the application file, which is for rewrite with the update data, and transmits the obtained update data and location information to an electronic device via a network. Herewith, it is possible to reduce the amount of data for communication as compared to the case of transmitting the application file.

Here, the application file in the pre-update state may be divided into one or more pre-update blocks each having a predetermined size. In this case, the $1^{st}$ obtaining unit further obtains a pre-update tamper detection list including the pre-update blocks and one or more reference tamper detecting values which correspond one-to-one with the pre-update blocks. The update server apparatus further comprising: a tamper detection list generating unit operable to obtain one or more post-update blocks formed by dividing the updated application file into the predetermined size and recalculate a reference tamper detecting value for each of the post-update blocks to generate a new tamper detection list. The $2^{nd}$ obtaining unit further obtains, from the new tamper detection list, a post-update block including the update data, a recalculated reference tamper detecting value corresponding to the post-update block, and tamper-detecting-value location information indicating a location, within the pre-update tamper detection list, of a pre-update block corresponding to the post-update block. The transmitting unit further transmits, to the electronic device, the post-update block, the reference tamper detecting value, and the tamper-detecting-value location information obtained by the $2^{nd}$ obtaining unit.

According to the above structure, the update server apparatus transmits, to an electronic device, the post-update block obtained by the $2^{nd}$ obtaining unit, the reference tamper detecting value of the post-update block, and the tamper-detecting-value location information. Herewith, the electronic device is able to always make the reference tamper detecting value for the updated block the latest value.

Here, the tamper detection list generating unit may store therein a tamper detection key generated by an external apparatus using a partial key and a master key, and use the tamper detection key to recalculate the reference tamper detecting value for each of the post-update blocks.

According to the structure, the update server apparatus is able to calculate the reference tamper detecting value using the tamper detection key generated by using the partial key and the master key.

Here, the update server apparatus may update, when receiving an updated tamper detection key formed by the external apparatus updating the tamper detection key with use of an updated partial key and the master key, the stored tamper detection key with the updated tamper detection key and further receive the updated partial key from the external apparatus. In this case, the tamper detection list generating unit recalculates the reference tamper detecting value for each of the post-update blocks using the updated tamper detection key. The $2^{nd}$ obtaining unit further obtains key location information indicating a location, in the electronic device, at which the partial key is stored. The transmitting unit further transmits the updated partial key and the key location information to the electronic device.

According to the structure, the update server apparatus is able to update the tamper detection key. Herewith, even if the tamper detection key becomes known to an unauthorized analyzer, the update server apparatus is able to calculate a new reference tamper detecting value without using the tamper detection key known to the unauthorized analyzer by receiving a new tamper detection key from an external apparatus.

Here, the tamper detection list may include a data part made up of the post-update blocks and the reference tamper detecting value for each of the post-update blocks. In this case, the tamper detection list generating unit encrypts the data part of the new tamper detection list.

According to the structure, since the data part has been encrypted, the update server apparatus can prevent the tamper detection value of each block included in the tamper detection list from becoming known to an unauthorized analyzer.

Here, the tamper detection list may include a header part. In this case, the tamper detection list generating unit calculates a data-part tamper detecting value for the encrypted data part with use of the generated tamper detection key, and stores the calculated data-part tamper detecting value in the header part.

According to the structure, since the update server apparatus calculates the data-part tamper detecting value for the encrypted data part, it is possible to ensure the validity of the encrypted data part.

Here, the tamper detection list may include a header part and a data part made up of the post-update blocks and the reference tamper detecting value for each of the post-update blocks. In this case, the tamper detection list generating unit calculates a data-part tamper detecting value for the data part with use of the generated tamper detection key, and stores the calculated data-part tamper detecting value in the header part.

According to the structure, since the update server apparatus calculates the data-part tamper detecting value for the data part, it is possible to ensure the validity of the data part.

Here, the tamper detection list generating unit may encrypt the data part after calculating the data-part tamper detecting value.

According to the structure, since the data part has been encrypted, the update server apparatus can prevent the tamper detection value of each block included in the tamper detection list from becoming known to an unauthorized analyzer.

In addition, the present invention is a key generating apparatus for generating a tamper detection key used for calculating a tamper detecting value for each of one or more blocks formed by dividing an application file. Here, the tamper detection key is generated from a master key and a partial key. The key generating apparatus comprises: a key obtaining unit operable to obtain the master key and an updated partial key; a key generating unit operable to generate a new tamper detection key using the master key and the updated partial key; and a distributing unit operable to distribute the generated tamper detection key to an external apparatus that generates a tamper detection list including the tamper detecting value.

According to the structure, even if the tamper detection key is leaked from an external apparatus, the key update apparatus is able to generate a new tamper detection key different from the tamper detection key held by an external apparatus having performed unauthorized conduct, only by updating the partial key.

Here, the distributing unit may distribute the updated partial key, via the external apparatus, to an electronic device that examines whether the application file has been tampered with.

According to the structure, it is possible to distribute the updated partial key to the electronic device via an external apparatus.

BRIEF DESCRIPTION OF THE DRAWINGS

FIG. 18 shows an example of a data structure of a hash list 122a.

Figure 1:
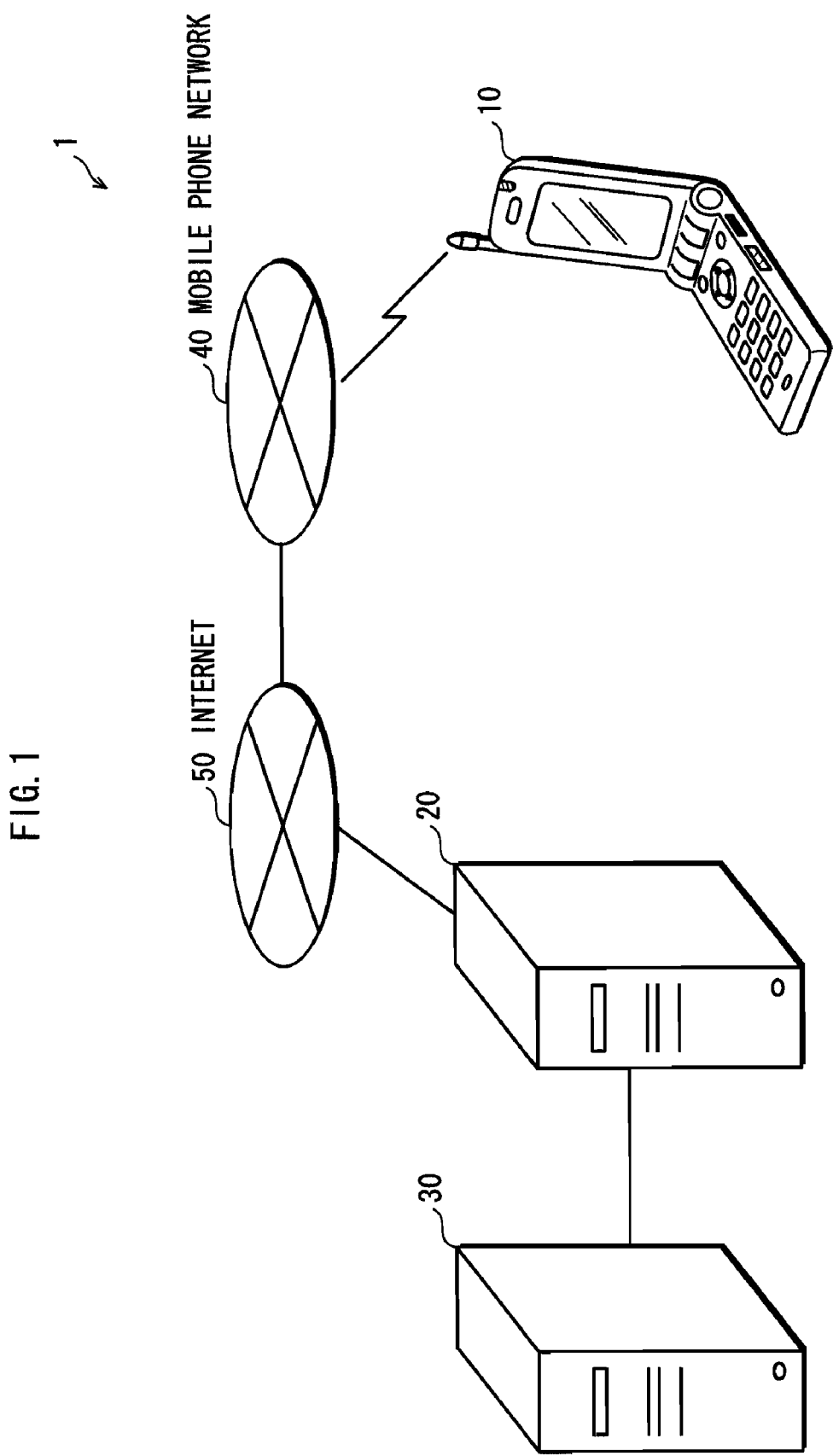
FIG. 1 shows an overview of a program update system 1.

EXPLANATION OF REFERENCES 1 program update system
10 mobile telephone
20 update server apparatus
30 key update apparatus
40 mobile telephone network
50 Internet
101 storage unit
102 control unit
103 update process unit
104 update file receiving unit
105 tamper detection executing unit
106 microphone
107 speaker
108 input unit
109 display unit
110 radio transmission unit
111 antenna
161 flag storage unit 162 update control unit
163 update data reading unit
164 update data analyzing unit
165 write location determining unit
166 update data writing unit
167 update check unit
171 detection control unit
172 tamper detection calling unit
173 tamper detection process unit
174 file reading unit
175 master key storage unit
176 master key
201 storage unit
202 data obtaining unit
203 hash list generation unit
204 hash list write unit
205 update request process unit
206 input unit
207 transmission/reception unit
210 tamper detection key storage unit
211 data receiving unit
212 hash list generation process unit
213 encryption process unit
214 update data list generation unit
215 tamper detection key
301 key obtaining unit
302 tamper detection key generation unit
303 tamper detection key distribution unit
304 output unit

DETAILED DESCRIPTION OF THE INVENTION

1. Embodiment 1

Embodiment 1 of the present invention is described next with reference to drawings.

1.1 Overview of Program Update System 1

FIG. 1 shows the entire structure of a program update system 1 according to Embodiment 1.

The program update system 1 includes a mobile telephone 10, an update server apparatus 20 and a key update apparatus 30.

The key update apparatus 30 updates a tamper detection key used in the update server apparatus 20 and mobile telephone 30. When the tamper detection key is illegally leaked, the key update apparatus 30 issues a new tamper detection key. The key update apparatus 30 is strictly managed by an authority that generates tamper detection keys. A tamper detection key is generated by a master key and a partial key. The master key is a key that will not be changed once it is generated; the partial key is a key updated when update of the tamper detection key is performed.

The mobile telephone 10 transmits, to the update server apparatus 20, update request information for requesting an update of a file pertaining to application software, and receives an update data list which is data pertaining to the update. Hereinafter, such application software is referred to as "AP" and a file pertaining to AP is referred to as an "AP related file". The mobile telephone 10 updates the file based on the received update data list. Here, an AP is, specifically speaking, a music recording and playback software application, or a video recording and playback software application. In addition, an AP related file may be: an AP itself; an encoder, a decoder, or a driver called from an AP; or a virtual execution environment, like Java (registered trademark) VM that provides an environment in which an AP operates. Such an AP related file is composed of one or more pieces of data.

In addition, the mobile telephone 10 checks, at the time of AP update and start-up, whether AP related files have been tampered with. Here, the term "tamper" indicates an unauthorized alteration of a file.

The update server apparatus 20 has update data lists, and transmits, when receiving update request information from the mobile telephone 10, an update data list corresponding to a file for which an update is requested to the mobile telephone 10.

The mobile telephone 10 and update server apparatus 20 communicate with each other via the mobile telephone network 40 and the Internet 50.

1.2 Structure of Mobile Telephone 10

Figure 2:
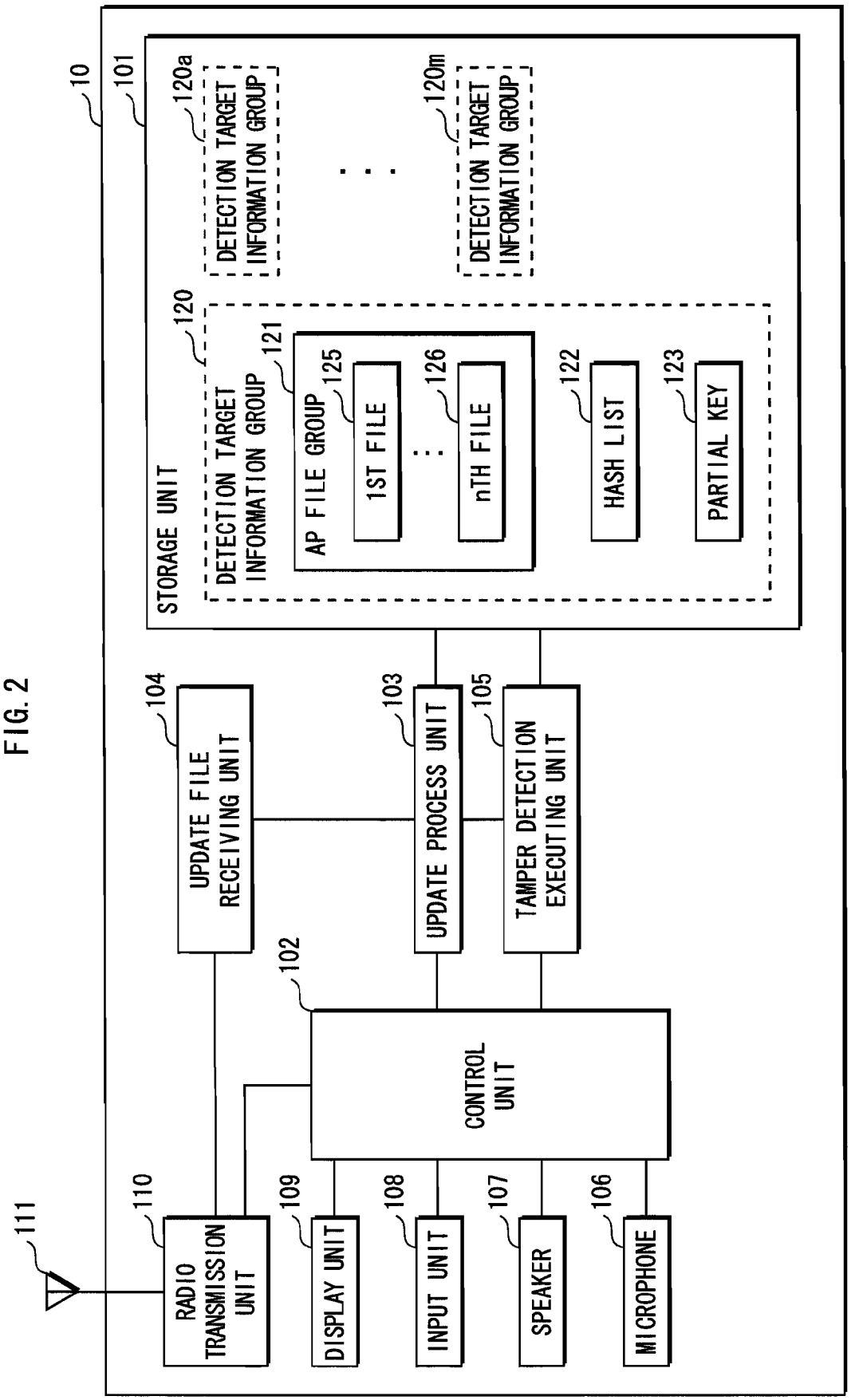
FIG. 2 is a block diagram showing a structure of a mobile telephone 10.

The mobile telephone 10 includes, as shown in FIG. 2: a storage unit 101; a control unit 102; an update process unit 103; an update file receiving unit 104; a tamper detection execution unit 105; a microphone 106; a speaker 107; an input unit 108; a display unit 109; a radio transmission unit 110; and an antenna 111.

(1) Storage Unit 101

The storage unit 101 stores therein detection target information groups 120, 120a, ..., and 120m, as shown in FIG. 2. Since the detection target information groups 120, 120a, ..., and 120m all have the same structure, the structure of the detection target information group 120 is representatively explained here.

The detection target information group 120 stores therein an AP file group 121, a hash list 122, and a partial key, as shown in FIG. 2.

(AP File Group 121)

The AP file group 121 includes a $1^{st}$ file 125, ..., and an $n^{th}$ file 126. The $1^{st}$ file 125, ..., and the $n^{th}$ file 126 are files subject to tamper detection. As described above, each of these files may be, specifically speaking: an AP itself; an encoder, a decoder, or a driver called from an AP; or a virtual execution environment, like Java (registered trademark) VM that provides an environment in which an AP operates. Here, n is an integer equal to or larger than 1. That is, the AP file group 121 stores therein one or more files.

Note that the file names of the $1^{st}$ file 125, ..., and the $n^{th}$ file 126 are hereinafter "file_1", ..., and "file_n", respectively. Each of the files is recorded at a fixed address when the mobile telephone is manufactured so as to allow partial updating.

(Hash List 122)

The hash list 122 stores therein a list of tamper-detection hash values for the $1^{st}$ file 125, ..., and the $n^{th}$ file 126. The hash list 122 is recorded at a fixed address when the mobile telephone is manufactured so as to allow partial updating.

The hash list 122 is explained here.

Figure 3:
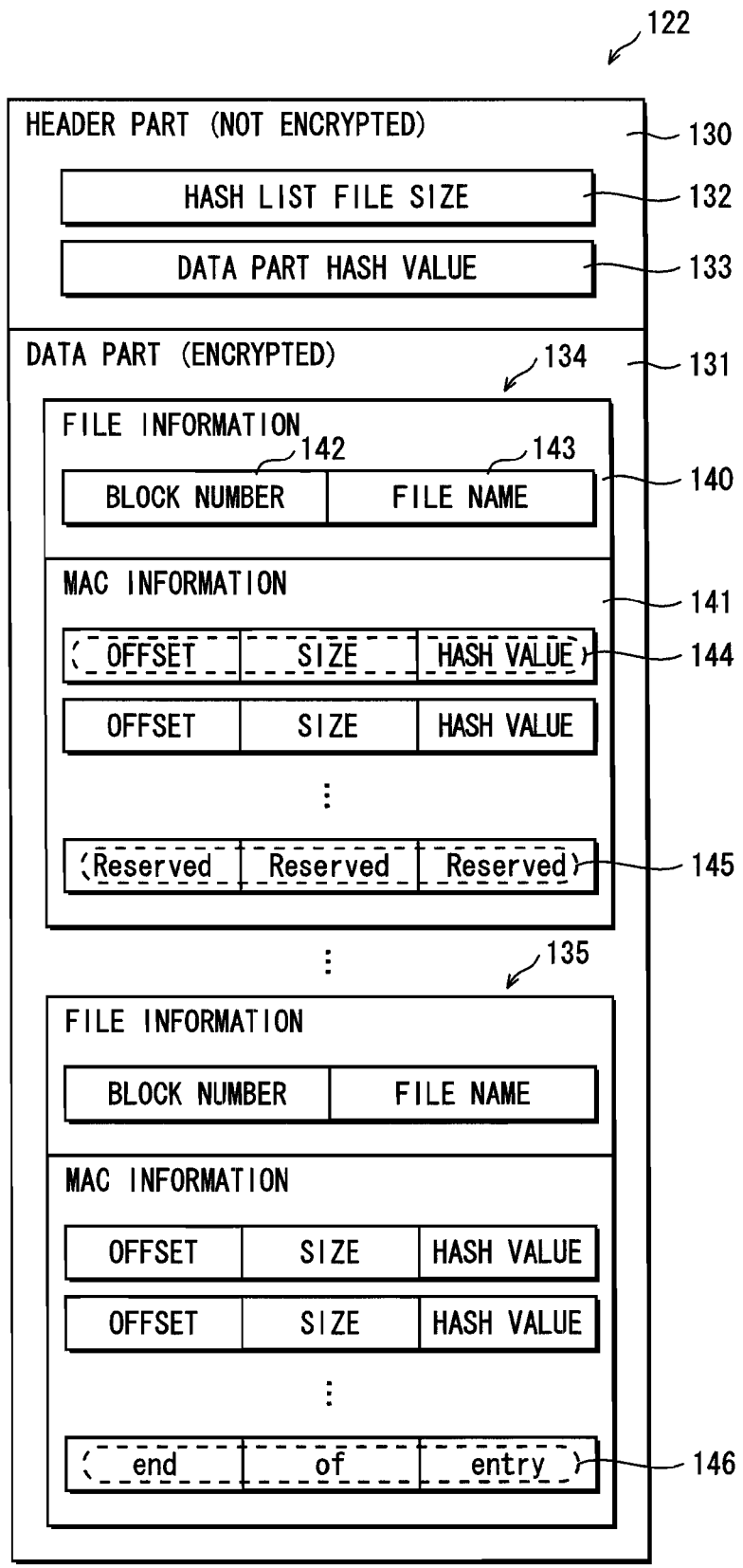
FIG. 3 shows an example of a data structure of a hash list 122.

FIG. 3 shows an example of the data structure of the hash list 122.

The hash list 122 is composed of a header part 130 which is not encrypted and a data part 131 which is encrypted. Here, an algorithm used for the encryption is, for example, a logic operation such as XOR, or an encryption algorithm such as DES (the Data Encryption Standard) or AES (Advanced Encryption Standard). The explanations of the encryption algorithms DES and AES are omitted here since they are publicly known.

The header part 130 is composed of a hash list file size 132 and a data part hash value 133. The hash list file size 132 indicates the data size of the entire hash list 122, with the header part 130 and the data part 131 combined. The data part hash value 133 indicates a hash value calculated by applying a hash calculation algorithm to the data part 131. Here, the hash calculation algorithm is an HMAC (Keyed-Hashing for Message Authentication) algorithm that applies a one-way function, such as SHA-1 or MD5, to a key value. Assume in the following description that the hash calculation algorithm for calculating a hash value is an HMAC algorithm.

The data part 131 is composed of one or more pieces of hash information. Here, the data part 131 is composed of a hash information piece 134, . . . , and a hash information piece 135. At least one piece of hash information is present for a file subject to tamper detection.

The hash information piece 134 is composed of one piece of file information 140 and multiple pieces of MAC information 141.

The file information 140 is composed of a block number 142 indicating the number of blocks generated by dividing a file subject to tamper detection and a file name 143 indicating the file subject to tamper detection. Here, the file name is shown in a format including a path, such as an absolute path or a relative path, which allows specification of a location of the file subject to tamper detection within the file system.

The MAC information piece 141 is composed of one or more entries. Here, the number of the entries is a value indicated by the block number 142 plus 1.

An entry 144 is composed of: an offset of a divided block of the file indicated by the file name 143 from the start address; a size of the block; and a hash value calculated by applying a hash calculation algorithm to the block. Note that each of the entries up to the $(n-1)^{th}$ entry has the same structure, and therefore the description is omitted here. Hash values stored in the hash list 122 are reference values used in the tamper detection as criteria to determine whether tampering has been made.

An entry 145 located at the end of the MAC information piece 141 is an empty entry reserved for updating, and "Reserved" is written thereto, in place of the offset, size and hash value. Note that the entry located at the end of the MAC information piece 141 is referred also as to the last entry.

In the last entry of the hash information piece located at the end of the data part 131, "end of entry"—information indicating the entry is the last entry of the hash list 122—is embedded. Here, since the hash information piece 135 is a hash information piece located at the end of the data part 131, "end of entry" is embedded in a last entry 146 of the hash information piece 135. The remaining elements of the hash information piece 135 are the same as those of the hash information piece 134, except for the last entry 145, and therefore, the explanations are omitted here.

The data part 131 has been encrypted, as described above. The encryption is performed on the basis of the file information 140 or each entry of the MAC information 141. Herewith, the update of the hash list 122 can be made with respect to each file information piece 140 and each entry of the MAC information 141.

Assume here that the hash list 122 is associated with AP identification information used for identifying an AP that is included in the detection target information group 120 in which the hash list 122 is included.

(Partial Key 123)

The partial key 123 is used, when tamper detection is performed, with a master key to calculate a tamper detection key. The partial key 123 is recorded at a fixed address when the mobile telephone is manufactured so as to allow updating.

Assume here that, as in the case of the hash list 122, the partial key 123 is associated with the AP identification information for identifying an AP that is included in the detection target information group 120 in which the partial key 123 is included.

(2) Control Unit 102

The control unit 102 performs overall control over the mobile telephone 10.

The control unit 102 performs, when receiving a signal regarding a telephone conversation (audio signal) from the radio transmission unit 110, a signal process for outputting the received signal to the speaker 107.

The control unit 102 performs a signal process for outputting a signal regarding a telephone conversation (audio signal) from the microphone 106 to the radio transmission unit 110.

The control unit 102 outputs, when receiving an update instruction for updating an AP related file from the input unit 108, an update start order indicating a start of the update process of the file to the update process unit 103. Here, the update instruction and update start order include AP identification information indicating an update target AP.

The control unit 102 displays, when receiving a notice of completion of the file update from the update process unit 103, a message of the update completion via the display unit 109.

The control unit 102 displays, when receiving a notice of failure of the file update from the update process unit 103, a message of the update failure via the display unit 109. The control unit 102 outputs, when receiving an instruction of an update retry from the input unit 108, an update-retry start order indicating a start of a file update retry to the update process unit 103. The control unit 102 outputs, when receiving an instruction for not performing an update retry from the input unit 108, an update end order indicating an end of the update process of the file to the update process unit 103.

The control unit 102 performs, when receiving an AP start-up instruction from the input unit 108, a start-up of a target AP. At this point, in the case where the started-up AP is subject to tamper detection, the started-up AP outputs a detection start order and AP identification information used for identifying itself through the control unit 102 to the tamper detection execution unit 105. The tamper detection execution unit 105 receives the detection start order from the control unit 102.

The control unit 102 performs, when receiving a nontampering notice indicating that no tampering has been made from the tamper detection executing unit 105, an operation relating to an AP for which a start-up instruction has been issued.

The control unit 102 ends, when receiving a notice of detection of tampering from the tamper detection executing unit 105, an operation of an AP for which a start-up instruction has been issued.

(3) Update Process Unit 103

The update process unit 103 updates update-target data, such as a file, a list or a key, based on an update data list 150 received by the update file receiving unit 104 from the update server apparatus 20.

Figure 4:
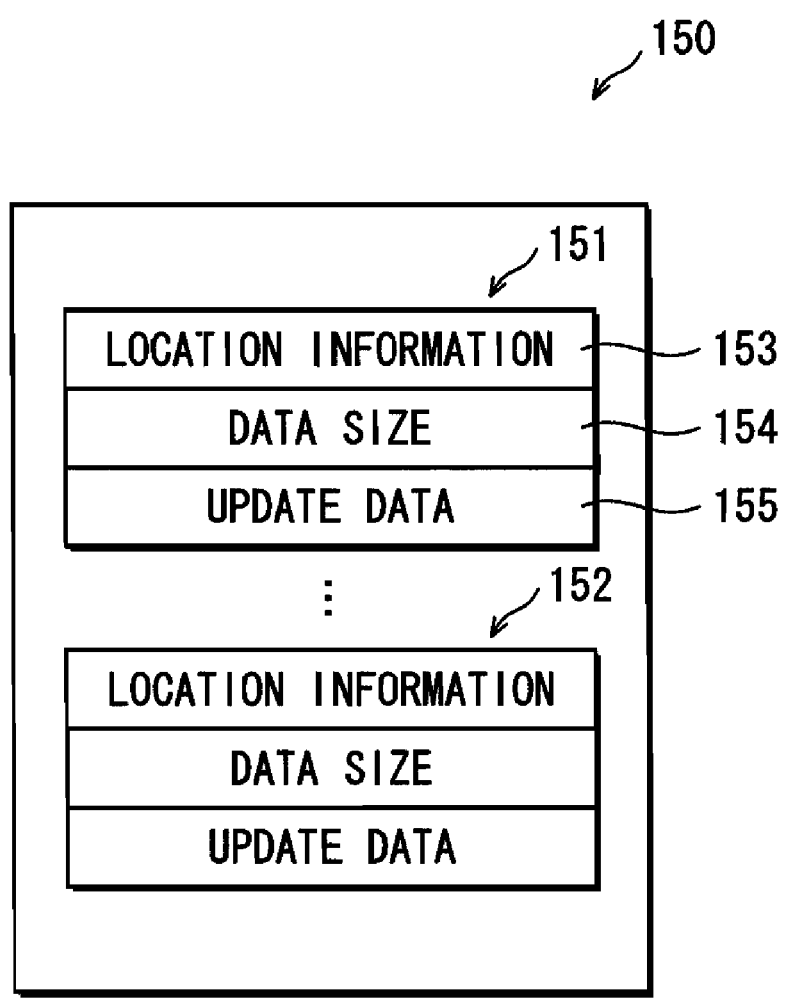
FIG. 4 shows an example of a data structure of an update data list 150.

Here, the update data list 150 is composed of one or more pieces of update information 151, . . . , and 152, as shown in FIG. 4. The update information piece 151 is composed of location information 153, a data size 154, and update data 155. The location information 153 is information indicating a location of data to be updated. For example, the location information 153 is expressed by, for example, a file name, an offset from the start of the file, or address information. The data size 154 indicates the size of data to be updated. The update data 155 includes one or more update blocks for a file to be updated as well as the hash list file size 132, the data part hash value 133, the file information, and entries included in the MAC information in the hash list 122. Here, the update data includes one or more pieces of data, which are values, such as a hash list file size and a data part hash value, and statements used for executing application software.

Assume the case in which a file is divided into multiple blocks and the $2^{nd}$ and $4^{th}$ blocks are to be updated. In the location information, an offset indicating the location of the $2^{nd}$ block is stored. The data size stores therein the total size of the $2^{nd}$ to $4^{th}$ blocks added together. The update data stores therein the $2^{nd}$ to $4^{th}$ blocks after update. Here, since the hash list needs to be updated, an offset indicating a location of an entry including a hash value of the $2^{nd}$ block is stored in the location information. The data size stores therein the total size of entries including hash values of the $2^{nd}$ to $4^{th}$ blocks. The update data stores therein entries corresponding to the $2^{nd}$ to $4^{th}$ blocks after updating.

The update process unit 103 updates a file, the hash list file size 132, data part hash value 133, file information, and entries included in the MAC information in the hash list 122, and the partial key 123 based on the update data list 150.

Figure 5:
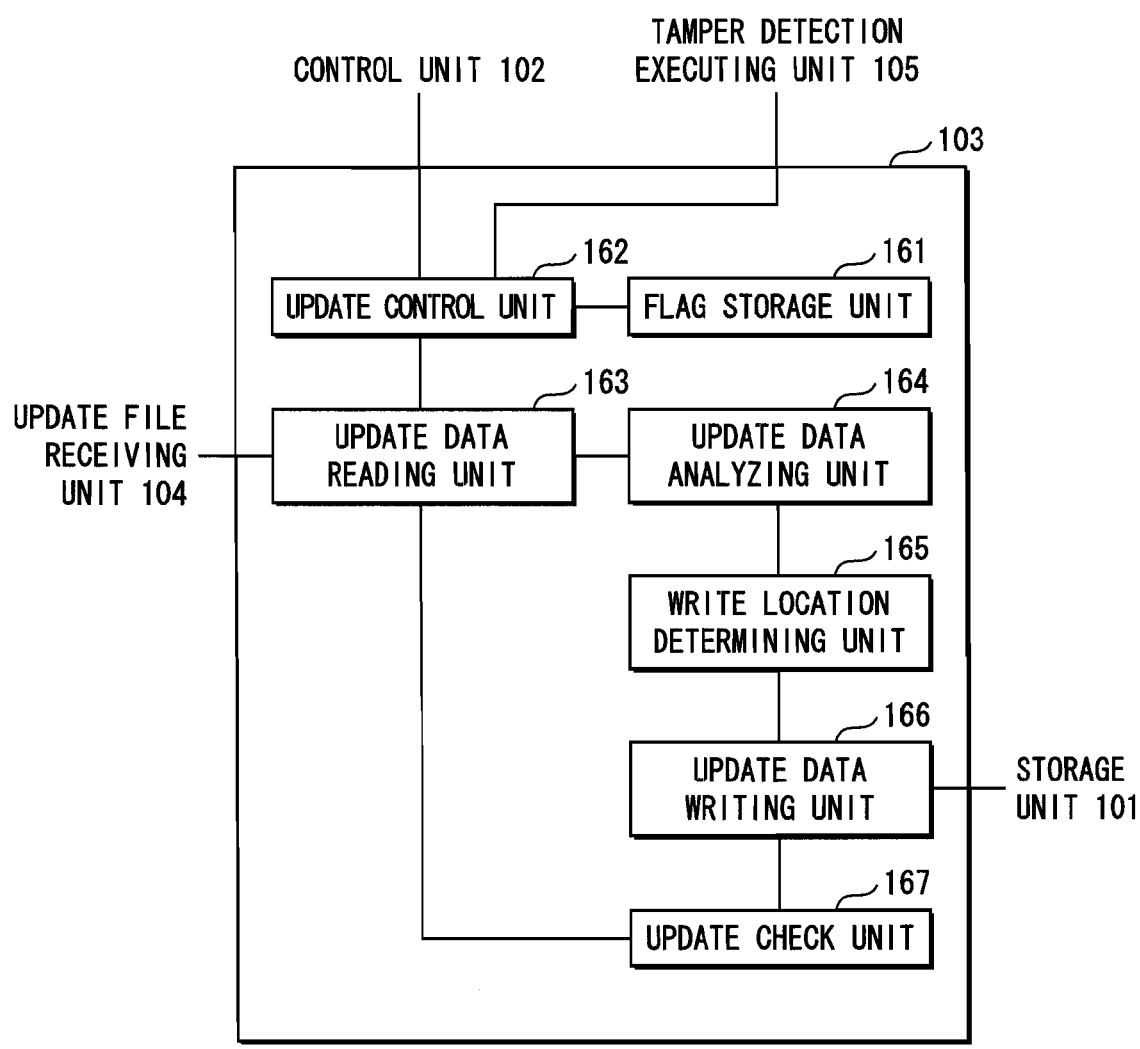
FIG. 5 is a block diagram showing a structure of an update process unit 103.

The update process unit 103 is, as shown in FIG. 5, composed of: a flag storing unit 161; an update control unit 162; an update data reading unit 163; an update data analyzing unit 164; a write location determining unit 165; an update data writing unit 166; and an update check unit 167.

The update process unit 103 is protected by tamper resistant technologies so as to be resistant to analyses conducted by malicious users. Tamper resistant technologies are publicly known, and therefore the description is omitted here.

(Flag Storage Unit 161)

The flag storage unit 161 stores therein a flag indicating whether an update of an AP related file is in progress. Here, the flag value "0" indicates that the update process unit 103 is not performing the update; the flag value "1" indicates that the update process unit 103 is in the middle of the update process. The flag storage unit 161 is, specifically speaking, a nonvolatile memory. That is, even if the mobile telephone 10 is powered off, the content stored in the flag storage unit 161 is maintained.

(Update Control Unit 162)

The update control unit 162 sets, when receiving an update start order from the control unit 102, interrupt inhibition to the control unit 102 so as not to be interrupted by processes specified by other orders.

The update control unit 162 sets the flag value stored in the flag storage unit 161 to "1".

The update control unit 162 outputs AP identification information included in the received update start order to the update data reading unit 163.

The update control unit 162 outputs, when receiving a writing completion notice indicating that writing of all update data is completed from the update data reading unit 163, a detection start order indicating a start of the tamper detection process and AP identification information to the tamper detection execution unit 105.

The update control unit 162 outputs, when receiving a nontampering notice from the tamper detection executing unit 105, a notice of update completion to the control unit 102. The update control unit 162 terminates the interrupt inhibition having been set to the control unit 102, and sets the flag value stored in the flag storage unit 161 to "0".

The update control unit 162 outputs, when receiving a notice of detection of tampering from the tamper detection executing unit 105, a notice of update failure to the control unit 102. The update control unit 162 outputs, when receiving an update retry start order from the control unit 102, the AP identification information once again to the update data reading unit 163.

The update control unit 162 terminates, when receiving an update end order from the control unit 102, the interrupt inhibition having been set to the update control unit 162, and sets the flag value stored in the flag storage unit 161 to "0".

When the mobile telephone 10 is powered on and a power supply is started, the update control unit 162 checks the flag value stored in the flag storage unit 161. When the value is "1", the update control unit 162 determines that an update process is in progress and then sets interrupt inhibition to the control unit 102. The update control unit 162 outputs a restart order indicating a restart of an update process to the update data reading unit 163. When receiving a no-restart requiring notice indicating that a restart of an update process is not necessary from the update data reading unit 163, the update control unit 162 terminates the interrupt inhibition having been set to the control unit 102, and sets the flag value stored in the flag storage unit 161 to "0".

(Update Data Reading Unit 163)

The update data reading unit 163 outputs, when receiving the AP identification information from the update control unit 162, the received AP identification information to the update file receiving unit 104.

When receiving, from the update file receiving unit 104, a reception completion notice indicating that reception of the update data list 150 from the update server apparatus 20 is completed, the update data reading unit 163 reads one unread update information piece from the received update data list 150.

When receiving, from the update check unit 167, a normal end notice indicating that writing of the update data is completed normally, the update reading unit 163 judges whether an unread update information piece is present in the received update data list 150. When an unread update information piece is determined to be present, the update data reading unit 163 obtains the unread update information piece. When an unread update information piece is determined not to be present, the update data reading unit 163 outputs a writing completion notice to the update control unit 162 and update file receiving unit 104. When receiving, from the update check unit 167, an abnormal end notice indicating that writing of the update data is unsuccessful, the update data reading unit 163 reads an update information piece read last time once again.

When receiving a restart order from the update control unit 162, the update data reading unit 163 outputs the received restart order to the update file receiving unit 104. Subsequently, when receiving a reception completion notice from the update file receiving unit 104, the update data reading unit 163 performs the same operation above.

When receiving a no-restart requiring notice, the update data reading unit 163 outputs the received no-restart requiring notice to the update control unit 162.

(Update Data Analyzing Unit 164)

The update data analyzing unit 164 divides an update information piece read by the update data reading unit 163 into the location information, the data size and the update data. Herewith, the update data analyzing unit 164 is able to obtain the location information, the data size and the update data from the update information.

(Write Location Determining Unit 165)

The write location determining unit 165 determines, for update data, a write location in the storage unit 101 based on the location information obtained by the update data analyzing unit 164.

(Update Data Writing Unit 166)

The update data writing unit 166 writes the update data obtained by the update data analyzing unit 164 in a place which starts from the write location determined by the write location determining unit 165.

(Update Check Unit 167)

The update check unit 167 checks whether writing performed by the update data writing unit 166 has been normally ended.

When determining that it has been normally ended, the update check unit 167 outputs a normal end notice to the update data reading unit 163; when determining that it has not been normally ended, the update check unit 167 outputs an abnormal end notice to the update data reading unit 163.

(4) Update File Receiving Unit 104

The update file receiving unit 104 prestores therein a terminal identifier that identifies the mobile telephone 10.

The update file receiving unit 104 has an AP identification information storage area for storing AP identification information received from the update process unit 103, and a list storage area for storing the update data list 150 received from the update server apparatus 20. Here, the AP identification information storage area and list storage area are nonvolatile memories.

When receiving AP identification information from the update data reading unit 163 of the update process unit 103, the update file receiving unit 104 transmits the received AP identification information, the terminal identifier and update request information to the update server apparatus 20 via the radio transmission unit 110, and stores the received AP identification information in the AP identification information storage area.

When receiving the update data list 150 from the update server apparatus 20 via the radio transmission unit 110, the update file receiving unit 104 stores the received update data list 150 in the list storage area. Furthermore, after the completion of storing the received update data list 150, the update file receiving unit 104 deletes the AP identification information stored in the AP identification information storage area, and outputs a reception completion notice to the update data reading unit 163.

When receiving a write completion notice from the update data reading unit 163, the update file receiving unit 104 deletes the update data list 150 stored in the list storage area.

When receiving a restart order from the update data reading unit 163, the update file receiving unit 104 judges whether AP identification information stored in the AP identification information storage area is present. When determining that the AP identification is present, the update file receiving unit 104 transmits the stored AP identification information and the terminal identifier to the update server apparatus 20 via the radio transmission unit 110, and performs the same operation above.

When determining that no AP identification information is present in the AP identification information storage area, the update file receiving unit 104 judges whether the update data list 150 is stored in the list storage area. When determining that the update data list 150 is stored therein, the update file receiving unit 104 outputs a reception completion notice to the update data reading unit 163. When determining that the update data list 150 is not stored therein, the update file receiving unit 104 outputs a no-restart requiring notice to the update data reading unit 163.

(5) Tamper Detection Executing Unit 105

Figure 6:
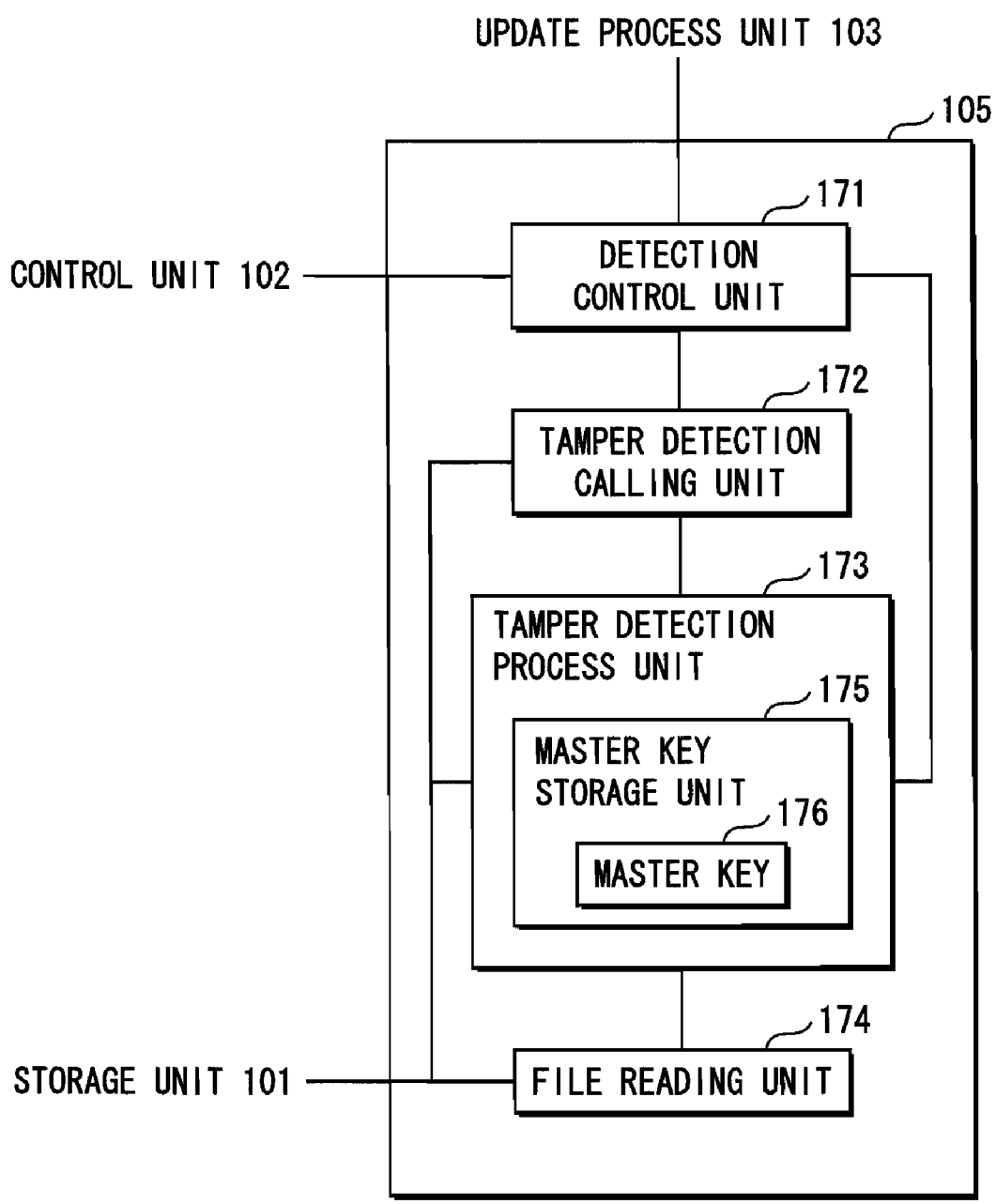
FIG. 6 is a block diagram showing a structure of a tamper detection executing unit 105.

The tamper detection execution unit 105 is composed of a detection control unit 171, a tamper detection calling unit 172, a tamper detection process unit 173, and a file reading unit 174, as shown in FIG. 6.

The tamper detection executing unit 105 is protected by tamper resistant technologies so as to be resistant to analyses conducted by malicious users. Tamper resistant technologies are publicly known, and therefore the description is omitted here.

(Detection Control Unit 171)

When receiving a detection start order and AP identification information from either the control unit 102 or the update control unit 162 of the update process unit 103, the detection control unit 171 outputs the received detection start order and AP identification information to the tamper detection calling unit 172.

The detection control unit 171 receives, from the tamper detection process unit 173, either a nontampering notice or a notice of detection of tampering.

The detection control unit 171 outputs the received notice to an output source of the detection start order and the AP identification information, i.e. either one of the control unit 102 or the update control unit 162 of the update process unit 103. Specifically speaking, in the case of receiving the detection start order from the control unit 102, the detection control unit 171 outputs the notice received from the tamper detection process unit 173 to the control unit 102. In the case of receiving the detection start order from the update control unit 162, the detection control unit 171 outputs the notice received from the tamper detection process unit 173 to the update control unit 162.

(Tamper Detection Calling Unit 172)

The tamper detection calling unit 172 reads, when a detection start order and AP identification information from the detection control unit 171, the hash list 122 corresponding to AP identification information received from the storage unit 101.

The tamper detection calling unit 172 outputs the read hash list 122 and the received detection start order and AP identification information to the tamper detection process unit 173.

(Tamper Detection Process Unit 173)

The tamper detection process unit 173 has a master key storage unit 175, as shown in FIG. 6. The master key storage unit 175 stores therein a master key 176.

When receiving the hash list 122, detection start order and AP identification information from the tamper detection calling unit 172, the tamper detection process unit 173 starts the process of tamper detection.

The tamper detection process unit 173 reads the partial key 123 corresponding to the received AP identification information from the storage unit 101.

The tamper detection process unit 173 calculates a tamper detection key using the read partial key 123, the master key 176 and a specific algorithm. Here, the specific algorithm is, for example, a logic operation such as XOR (exclusive OR), or an encryption algorithm such as DES or AES.

The tamper detection process unit 173 calculates a hash value for the data part 131 of the received hash list 122 using the calculated tamper detection key and a hash calculation algorithm. The tamper detection process unit 173 judges whether the calculated hash value and the data part hash value 133 included in the header part 130 of the hash list 122 match each other.

When determining that they do not match, the tamper detection process unit 173 outputs a notice of detection of tampering to the detection control unit 171.

When determining that they match each other, the tamper detection process unit 173 decrypts the data part 131 using the tamper detection key. Note that, for the decryption, a decryption algorithm corresponding to the algorithm used to encrypt the data part 131 is used.

The tamper detection process unit 173 reads an unread hash information piece from the decrypted data part. The tamper detection process unit 173 outputs a file information piece included in the read hash information piece to the file reading unit 174, and then receives, from the file reading unit 174, a file reading completion notice indicating that file reading has been completed.

The tamper detection process unit 173 obtains an unread entry from the read hash information piece and judges whether the obtained entry is the last entry.

In the case of determining that it is not the last entry, the tamper detection process unit 173 reads the offset and size included in the obtained entry, and obtains a block subject to tamper detection from the file read by the file reading unit 174 based on the read offset and size. The tamper detection process unit 173 calculates a detection hash value for the obtained block using the calculated tamper detection key and a hash calculation algorithm. The tamper detection process unit 173 judges whether the calculated detection hash value and a hash value included in the obtained entry match each other. When determining that they match each other, the tamper detection process unit 173 obtains an unread entry from the read hash information piece, and performs the above operation. When determining that they do not match, the tamper detection process unit 173 outputs a notice of detection of tampering to the detection control unit 171.

When determining that the obtained entry is the last entry, the tamper detection process unit 173 judges whether an unread hash information piece is present. When determining that it is present, the tamper detection process unit 173 reads the unread hash information piece, and performs the above operation. When determining that it is not present, the tamper detection process unit 173 outputs a nontampering notice to the detection control unit 171.

(File Reading Unit 174)

The file reading unit 174 has a file storage area for temporarily storing therein a read file.

When receiving a file information piece from the tamper detection process unit 173, the file reading unit 174 reads a target file for tamper detection from the storage unit 101 based on the file name included in the received file information piece.

The file reading unit 174 stores the read file in the file storage area, and outputs a file reading completion notice to the tamper detection process unit 173.

(6) Microphone 106

The microphone 106 receives audio sounds of the user, converts the received audio into an audio signal and outputs the converted audio signal to the control unit 102.

(7) Speaker 107

The speaker 107 outputs an audio signal processed by the control unit 102 as audio sounds.

(8) Input Unit 108

The input unit 108 outputs, when receiving an update instruction issued in response to the user's operation, the received update instruction to the control unit 102.

In the case where an update of the target file for tamper detection is unsuccessful, the input unit 108 outputs, when receiving an update retry instruction indicating that a retry of the update is necessary issued in response to the user's operation, the received update retry instruction to the control unit 102. In addition, in the case where update of the target file for tamper detection is unsuccessful, the input unit 108 outputs, when receiving an no-update retry requiring instruction indicating that a retry of the update is unnecessary issued in response to the user's operation, the received no-update retry requiring instruction to the control unit 102.

The input unit 108 outputs, when receiving an AP start-up instruction issued in response to the user's operation, the received start-up instruction to the control unit 102.

(9) Display Unit 109

The display unit 109 displays, when receiving a message of update completion from the control unit 102, the received message.

When receiving a message of update failure from the control unit 102, the display unit 109 displays the received message.

(10) Radio Transmission Unit 110

The radio transmission unit 110 has an antenna 111, and transmits and receives radio signals.

1.3 Structure of Update Server Apparatus 20

Figure 7:
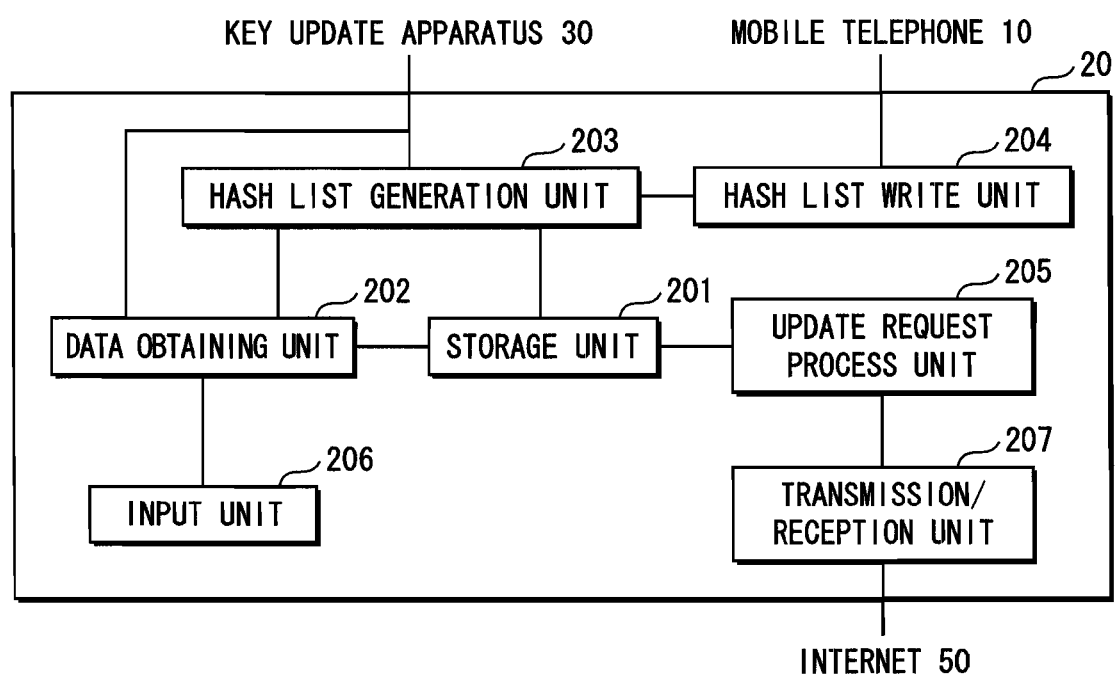
FIG. 7 is a block diagram showing a structure of an update server apparatus 20.

The update server apparatus 20 is composed of, as shown in FIG. 7: a storage unit 201; a data obtaining unit 202; a hash list generation unit 203; a hash list write unit 204; an update request process unit 205; an input unit 206; and a transmission/reception unit 207.

(1) Storage Unit 201

The storage unit 201 has an area for storing one or more update data lists for detection target information groups stored in the mobile telephone 10 and an area for storing hash lists.

Assume here that the storage unit 201 stores therein one or more update data lists for the detection target information group 120. Each of the stored update data lists is associated with AP identification information of an AP that includes files to be updated, and also their version status is managed. In addition, assume that the version status of an update data list transmitted to the mobile telephone 10 is managed in association with the terminal identifier of the mobile telephone 10. Also, the hash list is associated with AP identification information of a corresponding AP.

(2) Data Obtaining Unit 202

The data obtaining unit 202 obtains, when receiving an initial setting instruction from the input unit 206, one or more files subject to tamper detection, and a target path list. Here, a source from which these files and target path list are obtained is, for example, an external apparatus. The data obtaining unit 202 outputs the received initial setting instruction and the obtained one or more files and target path list to the hash list generation unit 203. The target path list is a list that stores therein, for each of the one or more files subject to tamper detection, a path name consisting of an absolute path or a relative path indicating a storage location of the file in the file system. Note that the initial setting instruction includes AP identification information of an AP corresponding to a hash list to be generated.

When receiving from the input unit 206 a $1^{st}$ update instruction indicating that one or more files subject to tamper detection have been updated, the data obtaining unit 202 obtains update files, each of which corresponds to a different one of one or more files to be updated, and a target path list including path names of the one or more files to be updated. Note that, here, the $1^{st}$ update instruction includes AP identification information of an AP which is subject to updating. Here, a source from which these update files and target path list are obtained is, for example, an external apparatus. The data obtaining unit 202 obtains, from the storage unit 201, a hash list corresponding to the AP identification information included in the $1^{st}$ update instruction. The data obtaining unit 202 outputs the received $1^{st}$ update instruction and the obtained one or more update files, target path list, and hash list to the hash list generation unit 203. Note that the update files are the latest files from which defects present in the original files have been removed.

The data obtaining unit 202 obtains, when receiving a $2^{nd}$ update instruction indicating that a partial key has been updated and an updated partial key from the key update apparatus 30, one or more files subject to tamper detection that uses the updated partial key, and a target path list. Note that the 2nd update instruction includes AP identification information of an AP which corresponds to the updated partial key. Here, a source from which these files and target path list are obtained is, for example, an external apparatus. The data obtaining unit 202 obtains, from the storage unit 201, a hash list corresponding to the AP identification information included in the $2^{nd}$ update instruction. The data obtaining unit 202 outputs the received $2^{nd}$ update instruction and partial key as well as the obtained one or more files, target path list and hash list to the hash list generation unit 203.

(3) Hash List Generation Unit 203

Figure 8:
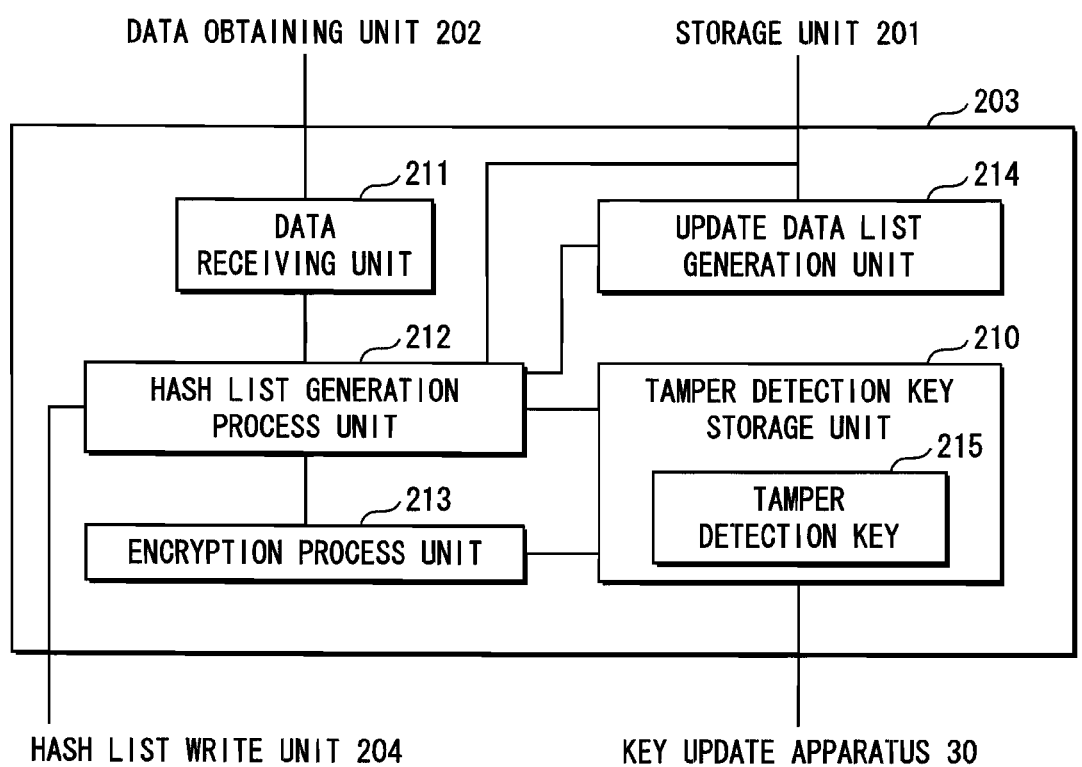
FIG. 8 is a block diagram showing a structure of a hash list generating unit 203.

The hash list generation unit 203 is composed of, as shown in FIG. 8: a tamper detection key storage unit 210; a data receiving unit 211; a hash list generation process unit 212; an encryption process unit 213; and an update data list generation unit 214.

Here, the hash list generation unit 203 may be a discrete apparatus (i.e. hash list generating apparatus).

(Tamper Detection Key Storage Unit 210)

The tamper detection key storage unit 210 stores therein a tamper detection key 215.

(Data Receiving Unit 211)

The data receiving unit 211 receives, from the data obtaining unit 202, one of an initial setting instruction, a $1^{st}$ update instruction and a $2^{nd}$ update instruction.

When receiving an initial setting instruction, the data receiving unit 211 also receives therefrom one or more files subject to tamper detection and a target path list, and outputs the received initial setting instruction, one or more files, and target path list to the hash list generation process unit 212.

When receiving a $1^{st}$ update instruction, the data receiving unit 211 also receives therefrom update files, each of which corresponds to a different one of one or more files to be updated, a target path list including path names of the one or more files to be updated, and a hash list, and outputs the received $1^{st}$ update instruction, one or more update files, target path list and hash list to the hash list generation process unit 212.

When receiving a $2^{nd}$ update instruction, the data receiving unit 211 also receives therefrom an updated partial key, one or more files subject to tamper detection that uses the updated partial key, a target path list and a hash list, and outputs the received $2^{nd}$ update instruction, partial key, one or more files, target path list and hash list to the hash list generation process unit 212.

(Hash List Generation Process Unit 212)

The hash list generation process unit 212 receives, from the data receiving unit 211, one of an initial setting instruction, a $1^{st}$ update instruction and a $2^{nd}$ update instruction.

<When Receiving Initial Setting Instruction>

When receiving an initial setting instruction, the hash list generation process unit 212 also receives one or more files subject to tamper detection and a target path list.

The hash list generation process unit 212 divides one of the received one or more files, into one or more blocks each having a predetermined size. The hash list generation process unit 212 reads, from the target path list, a path name indicating a location, in the mobile telephone 10, at which the divided file is stored, and generates a file information piece composed of the number of divided blocks and the read path name. The hash list generation process unit 212 also reads the tamper detection key 215 from the tamper detection key storage unit 210. The hash list generation process unit 212 calculates a hash value, with respect to each divided block with a predetermined size, using the read tamper detection key 215 and a hash calculation algorithm. Then, the hash list generation process unit 212 generates, for each block, an entry composed of an offset indicating the starting location of the block, the size of the block and the calculated hash value, and further generates an MAC information piece including generated entries. The hash list generation process unit 212 generates a hash information piece composed of the generated file information piece and MAC information piece. Note that, at this point, the hash information piece has yet to be encrypted. The hash list generation process unit 212 performs the operation on all the received files.

When having generated a hash information piece for each of the received one or more files, the hash list generation process unit 212 generates a data part composed of all the generated hash information pieces. At this point, the data part has yet to be encrypted. In the following description, a data part yet to be encrypted is referred to as a nonencrypted data part in order to distinguish it from an encrypted data part.

The hash list generation process unit 212 outputs the generated nonencrypted data part to the encryption process unit 213.

When receiving the encrypted data part from the encryption process unit 213, the hash list generation process unit 212 applies a hash calculation algorithm to the encrypted data part to calculate a hash value, and records this hash value to the data part hash value of a hash list. The hash list generation process unit 212 calculates the size of the hash list, and records the result of the calculation to the hash list file size. Herewith, the hash list generation process unit 212 is able to generate the header part of a hash list.

The hash list generation process unit 212 generates a hash list composed of the generated header part and the encrypted data part received from the encryption process unit 213.

The hash list generation process unit 212 stores the generated hash list in the storage unit and also outputs it to the hash list write unit 204. At this point, the generated hash list is made to be associated with the AP identification information included in the initial setting instruction.

<When Receiving $1^{st}$ Update Instruction>

When receiving a $1^{st}$ update instruction from the data receiving unit 211, the hash list generation process unit 212 also receives therefrom update files, each of which corresponds to a different one of one or more files to be updated, a target path list including path names of the one or more files to be updated, and a hash list. In the following description, the hash list received from the data receiving unit 211 is referred to as an old hash list.

The hash list generation process unit 212 divides one of the received one or more update files, into one or more blocks each having a predetermined size. The hash list generation process unit 212 reads, from the target path list, a path name indicating a location, in the mobile telephone 10, at which the divided update file is stored, and generates a file information piece composed of the number of divided blocks and the read path name. The hash list generation process unit 212 also reads the tamper detection key 215 from the tamper detection key storage unit 210. The hash list generation process unit 212 calculates a hash value, with respect to each divided block with a predetermined size, using the read tamper detection key 215 and a hash calculation algorithm. Then, the hash list generation process unit 212 generates, for each block, an entry composed of an offset indicating the starting location of the block, the size of the block and the calculated hash value, and further generates an MAC information piece including generated entries. The hash list generation process unit 212 generates a hash information piece composed of the generated file information piece and MAC information piece. Note that, at this point, the hash information piece has yet to be encrypted. The hash list generation process unit 212 performs the operation on all the received update files.

When having generated a hash information piece for each of the received one or more update files, the hash list generation process unit 212 generates a nonencrypted data part composed of all the generated hash information pieces.

The hash list generation process unit 212 outputs the generated nonencrypted data part to the encryption process unit 213.

When receiving the encrypted data part from the encryption process unit 213, the hash list generation process unit 212 applies a hash calculation algorithm to the encrypted data part to calculate a hash value, and records this hash value to the data part hash value of a hash list. The hash list generation process unit 212 calculates the size of the hash list, and records the result of the calculation to the hash list file size. Herewith, the hash list generation process unit 212 is able to generate the header part of a hash list.

The hash list generation process unit 212 generates a new hash list composed of the generated header part and the encrypted data part received from the encryption process unit 213.

The hash list generation process unit 212 outputs, to the update data list generation unit 214, the $1^{st}$ update instruction, the generated new hash list, the old hash list and one or more update files received from the data receiving unit 211.

<When Receiving $2^{nd}$ Update Instruction>

When receiving a $2^{nd}$ update instruction from the data receiving unit 211, the hash list generation process unit 212 also receives therefrom a partial key, one or more files subject to tamper detection, a target path list and an old hash list.

The hash list generation process unit 212 divides one of the received one or more files, into one or more blocks each having a predetermined size. The hash list generation process unit 212 reads, from the target path list, a path name indicating a location, in the mobile telephone 10, at which the divided update file is stored, and generates a file information piece composed of the number of divided blocks and the read path name. The hash list generation process unit 212 also reads the tamper detection key 215 from the tamper detection key storage unit 210. The hash list generation process unit 212 calculates a hash value, with respect to each divided block with a predetermined size, using the read tamper detection key 215 and a hash calculation algorithm. Then, the hash list generation process unit 212 generates, for each block, an entry composed of an offset indicating the starting location of the block, the size of the block and the calculated hash value, and further generates an MAC information piece including generated entries. The hash list generation process unit 212 generates a hash information piece composed of the generated file information piece and MAC information piece. Note that, at this point, the hash information piece has yet to be encrypted. The hash list generation process unit 212 performs the operation on all the received files.

When having generated a hash information piece for each of the received one or more files, the hash list generation process unit 212 generates a nonencrypted data part composed of all the generated hash information pieces.

The hash list generation process unit 212 outputs the generated nonencrypted data part to the encryption process unit 213.

When receiving the encrypted data part from the encryption process unit 213, the hash list generation process unit 212 applies a hash calculation algorithm to the encrypted data part to calculate a hash value, and records this hash value to the data part hash value of a hash list. The hash list generation process unit 212 calculates the size of the hash list, and records the result of the calculation to the hash list file size. Herewith, the hash list generation process unit 212 is able to generate the header part of a hash list.

The hash list generation process unit 212 generates a new hash list composed of the generated header part and the encrypted data part received from the encryption process unit 213.

The hash list generation process unit 212 outputs, to the update data list generation unit 214, the $2^{nd}$ update instruction, the generated new hash list, and the old hash list and partial key received from the data receiving unit 211.

(Encryption Process Unit 213)

The encryption process unit 213 reads, when receiving a nonencrypted data part from the hash list generation process unit 212, the tamper detection key 215 from the tamper detection key storage unit 210.

The encryption process unit 213 encrypts the received nonencrypted data part using the read tamper detection key. An algorithm used for the encryption is, for example, a logic operation such as XOR, or an encryption algorithm such as DES or AES, and corresponds to a decryption algorithm used by the mobile telephone 10. Here, the encryption is performed on the basis of the file information piece or each entry of the MAC information.

The encryption process unit 213 outputs the encrypted data part to the hash list generation process unit 212.

(Update Data List Generation Unit 214)

The update data list generation unit 214 receives either one of a $1^{st}$ update instruction and a $2^{nd}$ update instruction.

<When Receiving $1^{st}$ Update Instruction>

The update data list generation unit 214 further receives a new hash list, an old hash list and one or more update files from the hash list generation process unit 212.

The update data list generation unit 214 compares the received old hash list and new hash list, and extracts portions having different information from the new hash list. Here, the extracted information is, for example, entries of the data part and the data part hash value of the header part.

The update data list generation unit 214 generates an update data list using the extracted information and the one or more update files. At this point, the update data list generation unit 214 is able to determine updated portions of the update files according to the extracted information. This is because, when a file is divided, the division is made such a manner that each divided block has a predetermined size, and therefore a block in which no change has been made has the same hash value as that of the previous one. A block in which a change has been made has a different hash value from the previous block, and therefore entries for blocks having a changed portion can be extracted by comparison of the old hash list with the new hash list. As has been mentioned, since blocks are divided into a predetermined size, updated portions in the update files can be determined from extracted entries. The update data list generation unit 214 sets the determined updated portions as update data pieces, and obtains location information and block sizes of the update data pieces (i.e. the blocks including the updated portions). In the case when blocks including updated portions are continued, they may be joined together to form one piece of update data. In this case, the location information indicates the location of the first block of the continued blocks, and the size can be found from the number of the continued blocks.

The update data list generation unit 214 generates one or more update information pieces, each of which is composed of an update data piece, location information and a block size, and further generates an update data list consisting of the generated one or more update information pieces.

The update data list generation unit 214 stores the new hash list and the generated update data list in the storage unit 201. At this point, the generated update data list is made to be associated with the AP identification information included in the $1^{st}$ update instruction. Note that the old hash list stored in the storage unit 201 is deleted.

<When Receiving $2^{nd}$ Update Instruction>

The update data list generation unit 214 further receives a new hash list, an old hash list and a partial key from the hash list generation process unit 212.

The update data list generation unit 214 compares the received old hash list and new hash list, and extracts portions having different information from the new hash list. Here, the extracted information is, for example, entries of the data part and the data part hash value of the header part.

The update data list generation unit 214 generates an update data list including each of the extracted information and the received partial key as an individual update data piece. An update information piece whose update data piece is the partial key is generated as follows. The update data list generation unit 214 obtains location information of the received partial key indicating a location in the mobile telephone 10, at which the partial key is stored as well as the data size of the received partial key. The update data list generation unit 214 generates an update information piece composed of the obtained location information and data size and the partial key, which is the update data piece of the update information piece.

The generation of an update information piece whose update data piece is the extracted information is the same as the generation of the update information piece described in the above "When Receiving $1^{st}$ Update Instruction", and therefore the description is omitted here.

The update data list generation unit 214 generates an update data list consisting of the generated one or more update information pieces.

The update data list generation unit 214 stores the new hash list and the generated update data list in the storage unit 201. At this point, the generated update data list is made to be associated with the AP identification information included in the $1^{st}$ update instruction. Note that the old hash list stored in the storage unit 201 is deleted.

(4) Hash List Write Unit 204

The hash list write unit 204 is connected to a mobile telephone in production (before shipment), and capable of making access to the storage unit of the mobile telephone.

The hash list write unit 204 writes, when receiving a hash list from the hash list generating unit 203, the received hash list to the storage unit of the mobile telephone connected thereto. The address at which the hash list is written is a fixed address as described above.

(5) Update Request Process Unit 205

When receiving, from the mobile telephone 10 via the transmission/reception unit 207, AP identification information, the terminal identifier and update request information, the update request process unit 205 determines the version status of the update data list to be transmitted to the mobile telephone 10, using the received AP identification information and terminal identifier. As described above, the update server apparatus 20 manages each update data list in association with AP identification information of AP including a file to be updated as well as the version status of each update list.

In addition, the update server apparatus 20 also manages the terminal identifier of the mobile telephone 10 in association with the version status of the update data list transmitted to the mobile telephone 10, and is therefore able to determine an update data list to be transmitted.

The update request process unit 205 obtains an update data list to be transmitted from the storage unit 201, and transmits the obtained update data list to the mobile telephone 10 via the transmission/reception unit 207.

(6) Input Unit 206

The input unit 206 outputs, when receiving an initial setting instruction issued in response to the user's operation, the received initial setting instruction to the data obtaining unit 202.

The input unit 206 outputs, when receiving a $1^{st}$ update instruction issued in response to the user's operation, the received $1^{st}$ update instruction to the data obtaining unit 202.

(7) Transmission/Reception Unit 207

The transmission/reception unit 207 outputs, to the update request process unit 205, information received from the mobile telephone 10 via the mobile telephone network 40 and the Internet 50.

The transmission/reception unit 207 transmits information received from the update request process unit 205 to the mobile telephone 10 via the Internet 50 and the mobile telephone network 40.

1.4 Structure of Key Update Apparatus 30

Figure 9:
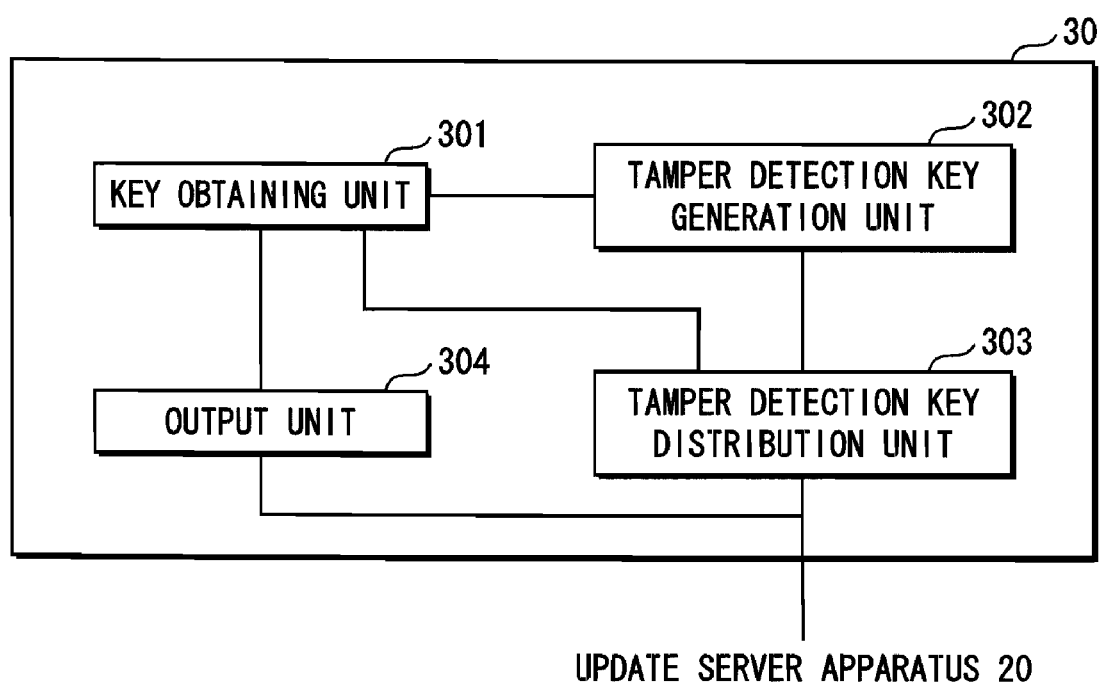
FIG. 9 is a block diagram showing a structure of a key update apparatus 30.

The key update apparatus 30 is composed of, as shown in FIG. 9: a key obtaining unit 301; a tamper detection key generation unit 302; a tamper detection key distribution unit 303; and an output unit 304.

The key update apparatus 30 updates a tamper detection key stored in the update server apparatus 20 in the case when the tamper detection key is analyzed and illegally leaked by a malicious user. The key update apparatus 30 is strictly managed by an authority that duly issues keys.

(1) Key Obtaining Unit 301

The key obtaining unit 301 obtains, from an external apparatus, a master key, an updated partial key, and AP identification information of an AP corresponding to the updated partial key. Note that the obtained master key is the same as the master key stored in the mobile telephone 10.

The key obtaining unit 301 outputs the received master key and the updated partial key to the tamper detection key generation unit 302.

The key obtaining unit 301 outputs, when receiving a notice of distribution completion indicating that distribution of a tamper detection key to the update server apparatus 20 has been completed from the tamper detection key distribution unit 303, a $2^{nd}$ update instruction including AP identification information and the updated partial key to the output unit 304.

(2) Tamper Detection Key Generation Unit 302

The tamper detection key generation unit 302 calculates, when receiving the master key and the updated partial key from the key obtaining unit 301, a tamper detection key using the received master key, the updated partial key and a specific algorithm. Note that the specific algorithm used here is the same as one used by the tamper detection process unit 173 of the mobile telephone 10.

The tamper detection key generation unit 302 outputs the calculated tamper detection key to the tamper detection key distribution unit 303.

(3) Tamper Detection Key Distribution Unit 303

The tamper detection key distribution unit 303 is connected to the update server apparatus 20 and is capable of making access to the tamper detection key storage unit 210.

The tamper detection key distribution unit 303 writes, when receiving a tamper detection key from the tamper detection key generation unit 302, the received tamper detection key to the tamper detection key storage unit 210. At this point, a previous tamper detection key stored in the tamper detection key storage unit 210 is deleted.

After completing the writing of the tamper detection key, the tamper detection key distribution unit 303 outputs a notice of distribution completion to the key obtaining unit 301.

(4) Output Unit 304

The output unit 304 is connected to the data obtaining unit 202 of the update server apparatus 20.

The output unit 304 outputs, when receiving a $2^{nd}$ update instruction and an updated partial key from the key obtaining unit 301, the received $2^{nd}$ update instruction and updated partial key to the data obtaining unit 202.

1.5 Operation of Update Server Apparatus 20

Figure 10:
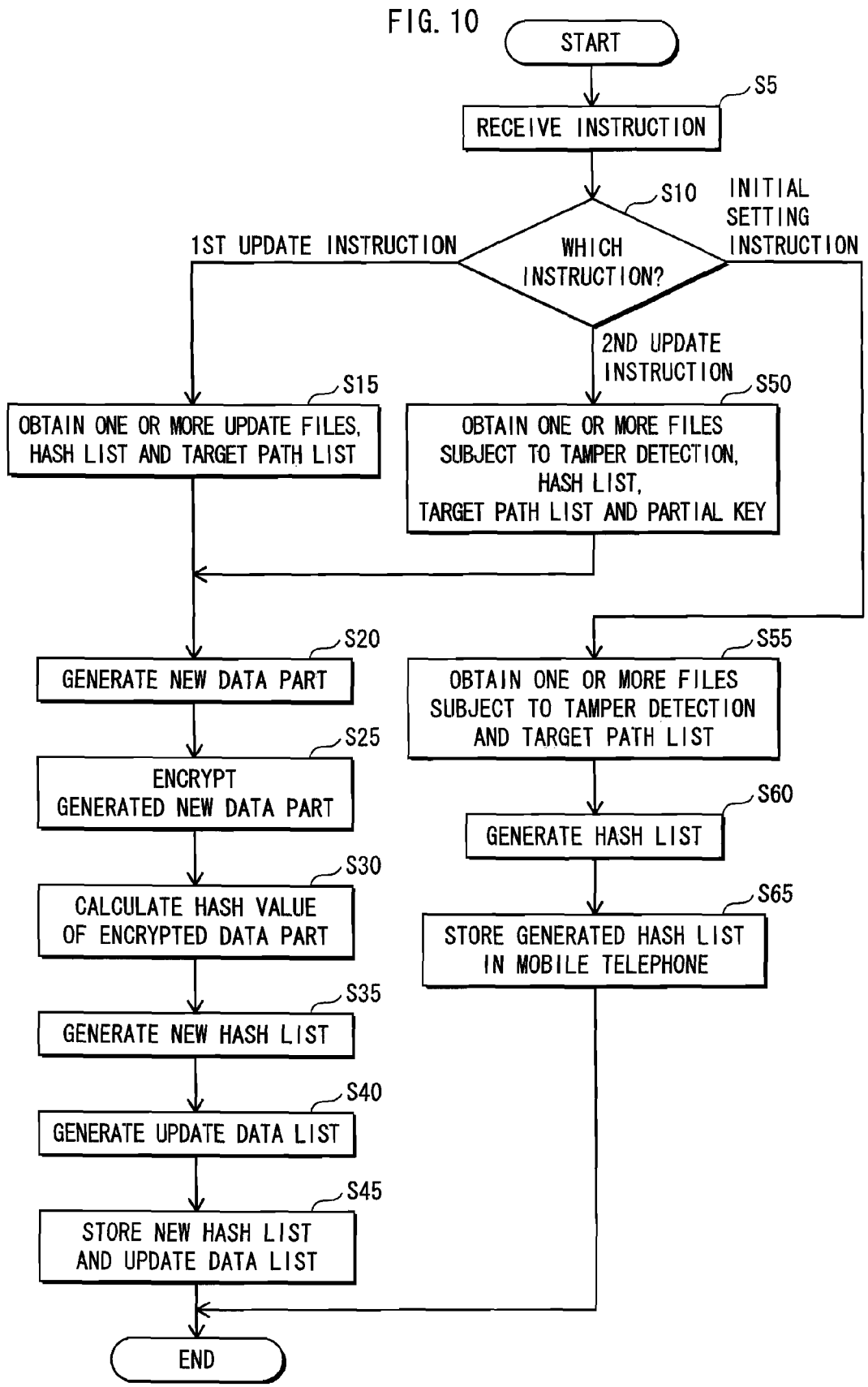
FIG. 10 is a flowchart showing an operation performed in the update server apparatus 20 to generate an update data list and a hash list.

The following describes an operation performed by the update server apparatus 20 to generate an update data list and a hash list with reference to a flowchart of FIG. 10.

The data receiving unit 211 receives, from the data obtaining unit 202, one of an initial setting instruction, a $1^{st}$ update instruction, and a $2^{nd}$ update instruction (Step S5).

When receiving a $1^{st}$ update instruction ("$1^{st}$ update instruction" in Step S10), the data receiving unit 211 obtains update files, each of which corresponds to a different one of one or more files to be updated, a target path list including path names of the one or more files to be updated, and a hash list (Step S15).

The data receiving unit 211 outputs the received $1^{st}$ update instruction, one or more update files, target path list and hash list (hereinafter referred to as the "old hash list") to the hash list generation process unit 212. The hash list generation process unit 212 receives, from the data receiving unit 211, the $1^{st}$ update instruction, one or more update files, target path list and old hash list.

The hash list generation process unit 212 divides one of the received one or more update files, into one or more blocks each having a predetermined size. The hash list generation process unit 212 reads, from the target path list, a path name indicating a location, in the mobile telephone 10, at which the divided update file is stored, and generates a file information piece composed of the number of divided blocks and the read path name. The hash list generation process unit 212 calculates a hash value by applying a hash calculation algorithm with respect to each divided block with a predetermined size. Then, the hash list generation process unit 212 generates, for each block, an entry composed of an offset indicating the starting location of the block, the size of the block and the calculated hash value, and further generates an MAC information piece including generated entries. The hash list generation process unit 212 generates a hash information piece composed of the generated file information piece and MAC information piece. Note that, at this point, the hash information piece has yet to be encrypted. The hash list generation process unit 212 performs the operation on all the received update files.

When having generated a hash information piece for each of the received one or more update files, the hash list generation process unit 212 generates a nonencrypted data part composed of all the generated hash information pieces (Step S20).

The hash list generation process unit 212 outputs the generated nonencrypted data part to the encryption process unit 213. The encryption process unit 213 reads, when receiving a nonencrypted data part from the hash list generation process unit 212, the tamper detection key 215 from the tamper detection key storage unit 210. The encryption process unit 213 encrypts the received nonencrypted data part using the read tamper detection key (Step S25). Here, the encryption is performed on the basis of the file information piece or each entry of the MAC information.

The encryption process unit 213 outputs the encrypted data part to the hash list generation process unit 212. When receiving the encrypted data part from the encryption process unit 213, the hash list generation process unit 212 applies a hash calculation algorithm to the encrypted data part to calculate a hash value, and records this hash value to the data part hash value of a hash list (Step S30).

The hash list generation process unit 212 calculates the size of the hash list, and records the result of the calculation to the hash list file size. Herewith, the hash list generation process unit 212 is able to generate the header part of a hash list.

The hash list generation process unit 212 generates a new hash list composed of the generated header part and the encrypted data part received from the encryption process unit 213 (Step S35).

The hash list generation process unit 212 outputs, to the update data list generation unit 214, the $1^{st}$ update instruction, the generated new hash list, and the old hash list and one or more update files received from the data receiving unit 211. The update data list generation unit 214 receives the $1^{st}$ update instruction, and also receives the new hash list, old hash list and one or more update files from the hash list generation process unit 212.

The update data list generation unit 214 compares the received old hash list and new hash list, and extracts portions having different information from the new hash list. Here, the extracted information is, for example, entries of the data part and the data part hash value of the header part. The update data list generation unit 214 generates an update data list using the extracted information and the one or more update files (Step S40).

The update data list generation unit 214 stores the new hash list and the generated update data list in the storage unit 201 (Step S45). At this point, the generated update data list is made to be associated with the AP identification information included in the $1^{st}$ update instruction. Note that the old hash list stored in the storage unit 201 is deleted.

When receiving a $2^{nd}$ update instruction ("$2^{nd}$ update instruction" in Step S10), the data receiving unit 211 obtains a partial key, one or more files subject to tamper detection, a target path list and a hash list (Step S50), and performs the operation of Steps S20 to S45. Note that, in this case, the instruction each component outputs and receives is the $2^{nd}$ update instruction. Additionally, in Step S40, the update data list is generated from the old hash list, new hash list and partial key. In Step S45, the generated update data list is associated with AP identification information included in the $2^{nd}$ update instruction.

When receiving an initial setting instruction ("initial setting instruction" in Step S10), the data receiving unit 211 obtains one or more files subject to tamper detection and a target path list (Step S55).

The data receiving unit 211 outputs the received initial setting instruction, one or more files, and target path list to the hash list generation process unit 212.

When receiving an initial setting instruction, the hash list generation process unit 212 also receives one or more files subject to tamper detection and a target path list, and generates a hash list (Step S60). Regarding the generation of the hash list, the operation here is conceptually the same as those of Steps S20 to S35, and therefore the detailed explanation is omitted.

The hash list generation process unit 212 stores the generated hash list in the storage unit and also outputs it to the hash list write unit 204. The hash list write unit 204 writes, when receiving the hash list from the hash list generating unit 203, the received hash list to the storage unit of the mobile telephone connected thereto (Step S65).

1.6 Outline of Operation for Hash List Update

Here, the outline of an operation to update a hash list is described with reference to a flowchart of FIG. 11.

The update control unit 162 of the update process unit 103 in the mobile telephone 10 receives an update instruction (Step S100), and sets interrupt inhibition to the control unit 102 (Step S105).

The update control unit 162 sets the flag value stored in the flag storage unit 161 to "1" (Step S110).

The update control unit 162 outputs AP identification information included in the received update start order to the update data reading unit 163.

When receiving AP identification information from the update data reading unit 163 of the update process unit 103, the update file receiving unit 104 transmits the received AP identification information, a prestored terminal identifier and update request information to the update server apparatus 20 via the radio transmission unit 110 (Step S115). The update file receiving unit 104 stores the received AP identification information in the AP identification information storage area.

The update request process unit 205 of the update server apparatus 20 receives the AP identification information, terminal identifier and update request information from the mobile telephone 10 via the transmission/reception unit 207 (Step S120).

The update request process unit 205 determines the version status of the update data list to be transmitted to the mobile telephone 10, using the received AP identification information and terminal identifier. The update request process unit 205 obtains the update data list to be transmitted from the storage unit 201 (Step S125), and transmits the obtained update data list to the mobile telephone 10 via the transmission/reception unit 207 (Step S130).

The mobile telephone 10 receives the update data list from the update server apparatus 20, and performs the update process (Step S135).

1.7 Operation of Update Process

Figure 11:
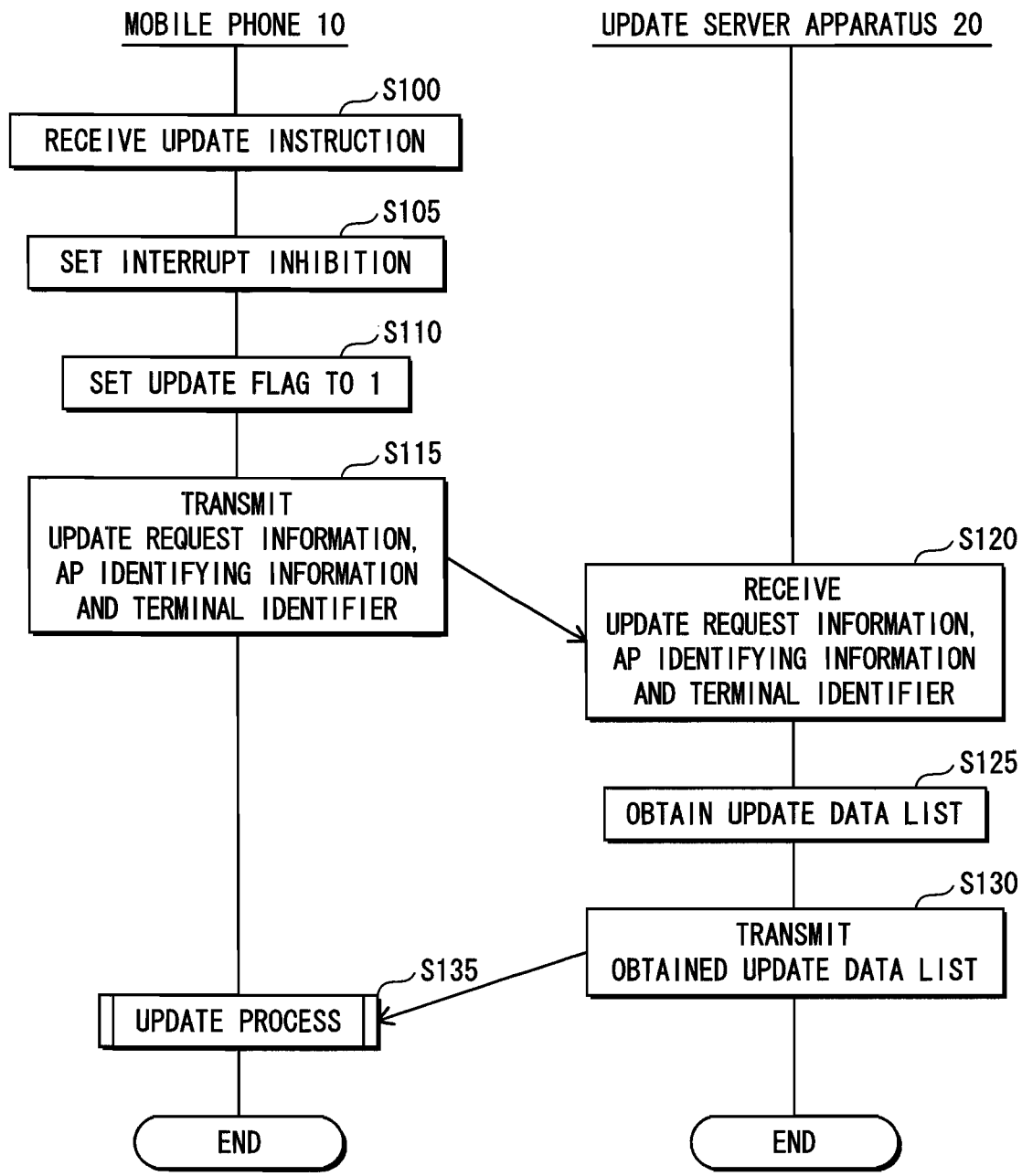
FIG. 11 is a flowchart showing an overview of an operation performed at updating of a hash list.
Figure 12:
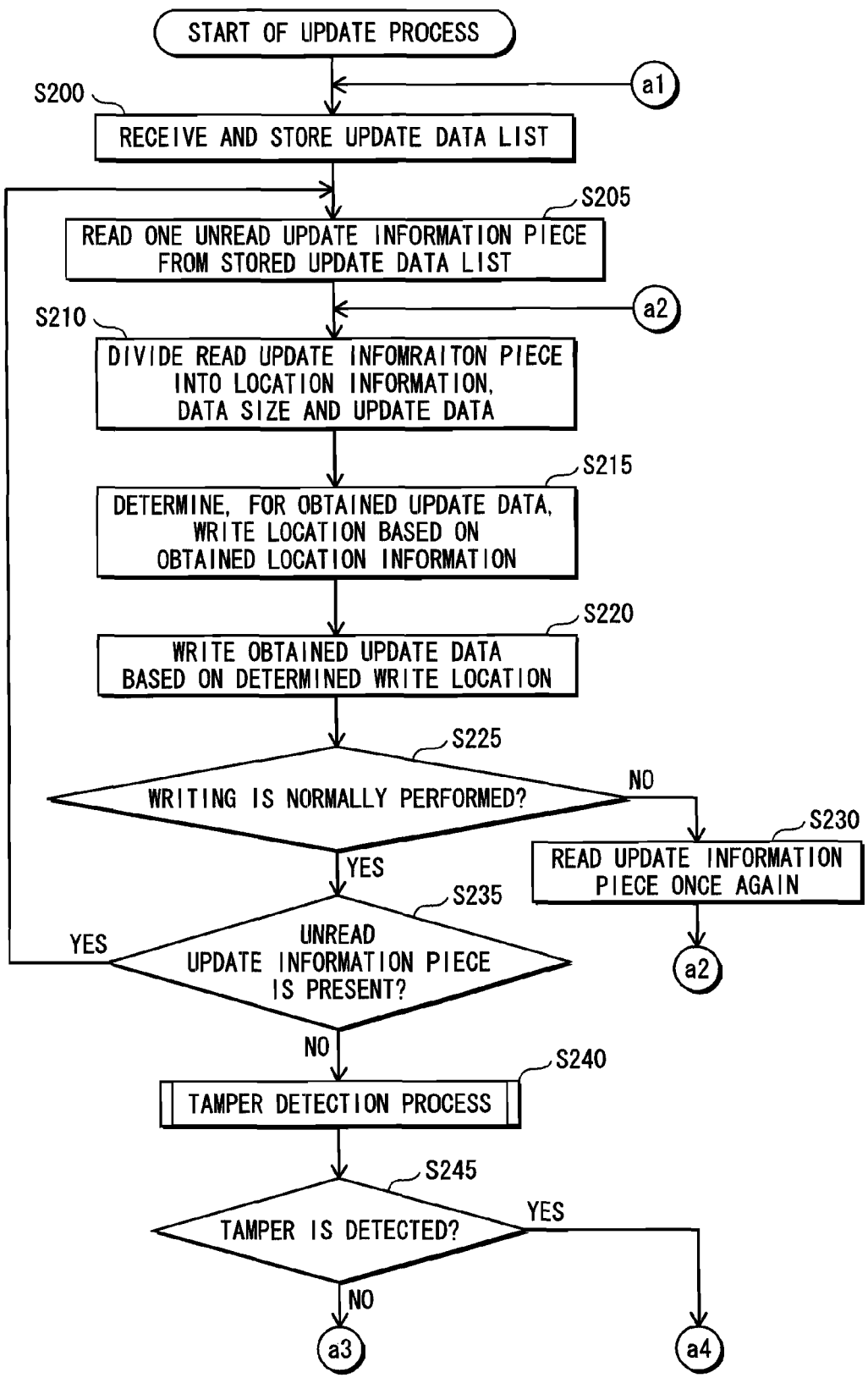
FIG. 12 is a flowchart showing an operation of an update process performed in the mobile telephone 10, continuing to FIG. 13.
Figure 13:
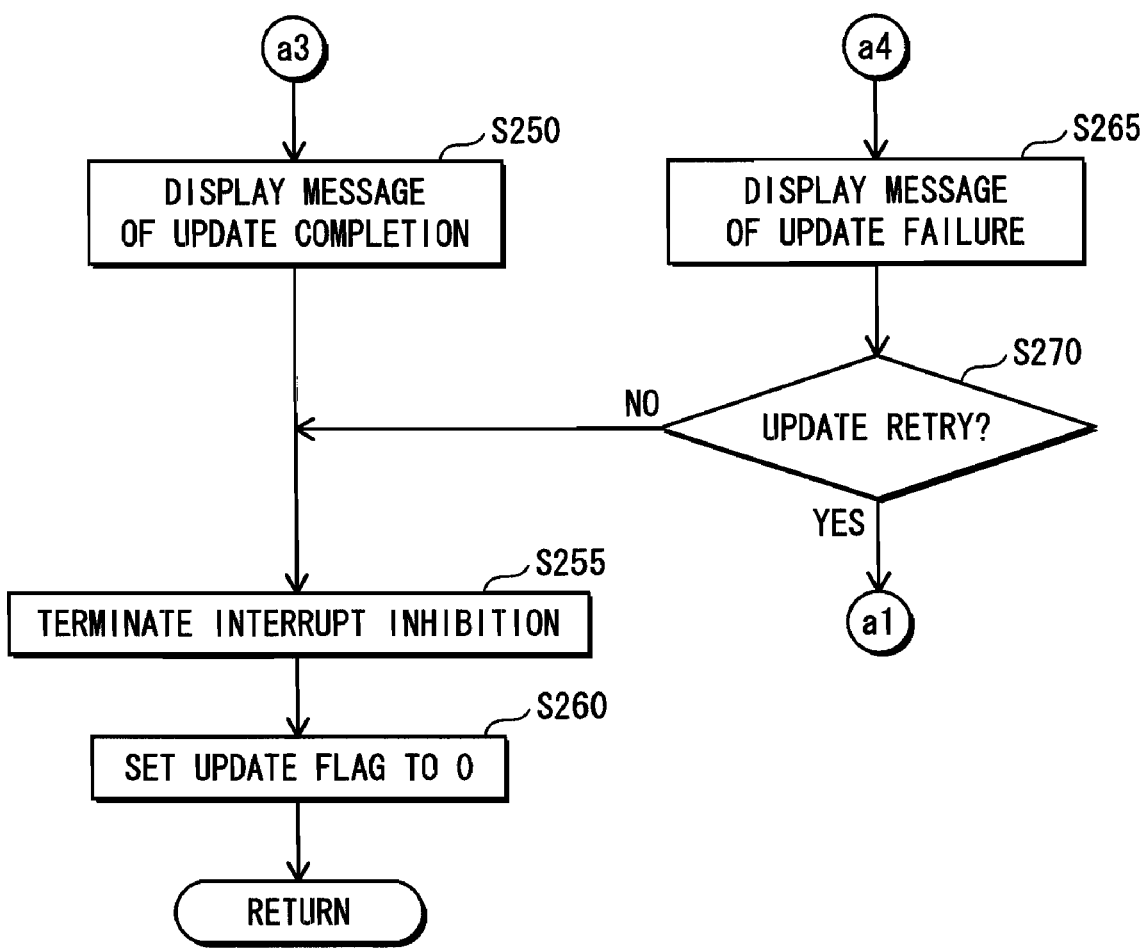
FIG. 13 is a flowchart showing the operation of the update process performed in the mobile telephone 10, continued from FIG. 12.

Here, the operation of the update process in Step S135 of FIG. 11 is described with reference to a flowchart shown in FIGS. 12 and 13.

When receiving the update data list from the update server apparatus 20 via the radio transmission unit 110, the update file receiving unit 104 stores the received update data list in the list storage area (Step S200).

After the completion of storing the received update data list, the update file receiving unit 104 deletes the AP identification information stored in the AP identification information storage area, and outputs a reception completion notice to the update data reading unit 163. The update data reading unit 163 receives, from the update file receiving unit 104, the receiving completion notice indicating that reception of the update data list from the update server apparatus 20 is completed.

The update data reading unit 163 reads one unread update information piece from the update data list stored in the list storage area of the update file receiving unit 104 (Step S205).

The update data analyzing unit 164 divides the update information piece read by the update data reading unit 163 into the location information, the data size and the update data (Step S210).

The write location determining unit 165 determines, for the update data, a write location in the storage unit 101 based on the location information obtained by the update data analyzing unit 164 (Step S215).

The update data writing unit 166 writes the update data obtained by the update data analyzing unit 164 in a place which starts from the write location determined by the write location determining unit 165 (Step S220).

The update check unit 167 checks whether writing performed by the update data writing unit 166 has been normally ended (Step S225).

When determining that it has not been normally ended ("NO" in Step S225), the update check unit 167 outputs an abnormal end notice to the update data reading unit 163. When receiving the abnormal end notice from the update check unit 167, the update data reading unit 163 reads once again the same update information piece read in Step S205 (Step S230), and then the update data reading unit 163 returns to Step S210.

When determining that it has been normally ended ("YES" in Step S225), the update check unit 167 outputs a normal end notice to the update data reading unit 163. When receiving the normal end notice from the update check unit 167, the update data reading unit 163 judges whether an unread update information piece is present in the update data list stored in the list storage area of the update file receiving unit 104 (Step S235).

When an unread update information piece is determined to be present ("YES" in Step S235), the update data reading unit 163 returns to Step S205. When an unread update information piece is determined not to be present ("NO" in Step S235), the update data reading unit 163 outputs a writing completion notice to the update control unit 162 and the update file receiving unit 104. The update file receiving unit 104 deletes, when receiving the writing completion notice from the update data reading unit 163, the update data list 150 stored in the list storage area. The update control unit 162 outputs, when receiving the writing completion notice from the update data reading unit 163, a detection start order indicating a start of the tamper detection process and AP identification information to the tamper detection execution unit 105.

When receiving the detection start order and AP identification information from the update control unit 162, the tamper detection execution unit 105 performs the tamper detection process (Step S240).

The update control unit 162 judges, when receiving a process result of the tamper detection process from the tamper detection execution unit 105, whether the received process result is a nontampering notice or a notice of detection of tampering (Step S245).

In the case when the update control unit 162 determines that no tampering has been detected, i.e. a nontampering notice is received ("NO" in Step S245), the update control unit 162 outputs a notice of update completion to the control unit 102. The control unit 102 displays, when receiving a notice of completion of the file update from the update process unit 103, a message of the update completion via the display unit 109 (Step s250).

The update control unit 162 terminates the interrupt inhibition having been set to the control unit 102 (Step S255), and sets the flag value stored in the flag storage unit 161 to "0" (Step S260).

In the case when the update control unit 162 determines that tampering has been detected, i.e. a notice of detection of tampering is received ("YES" in Step S245), the update control unit 162 outputs a notice of update failure to the control unit 102. The control unit 102 displays, when receiving a notice of failure of the file update from the update process unit 103, a message of the update failure via the display unit 109 (Step S265). The control unit 102 outputs, when receiving an instruction of an update retry from the input unit 108, an update-retry start order to the update process unit 103. The control unit 102 outputs, when receiving an instruction for not performing an update retry from the input unit 108, an update end order to the update process unit 103.

When receiving, from the control unit 102, either an update-retry start order or an update end order, the update control unit 162 judges whether the received order is an update-retry start order (Step S270). When determining that it is an update-retry start order, i.e. a retry of updating is determined to be performed ("YES" in Step S270), the update control unit 162 outputs once again the AP identification information to the update data reading unit 163, and returns to Step S200. In this case, the update data reading unit 163 receives the update data list once again.

When determining that the received order is an update end order, i.e. a retry of updating is determined not to be performed ("NO" in step S270), the update control unit 162 terminates the interrupt inhibition having been set to the control unit 102 (Step S255), and sets the flag value stored in the flag storage unit 161 to "0" (Step S260).

1.8 Operation at AP Start-Up

Here, the operation performed at the start-up of AP is described with reference to a flowchart of FIG. 14.

The control unit 102 receives, from the input unit 108, an AP start-up instruction indicating a start-up of AP which is subject to tamper detection (Step S300). The control unit 102 performs a start-up of AP. At this point, in the case where the started-up AP is subject to tamper detection, the started-up AP outputs a detection start order and AP identification information used for identifying itself through the control unit 102 to the tamper detection execution unit 105.

When receiving the detection start order and AP identification information from the control unit 102, the tamper detection executing unit 105 performs the tamper detection process (Step S305).

The control unit 102 judges, when receiving a process result of the tamper detection process from the tamper detection execution unit 105, whether the received process result is a nontampering notice or a notice of detection of tampering (Step S310).

In the case when the control unit 102 determines that no tampering has been detected, i.e. a nontampering notice is received ("NO" in Step S310), the control unit 102 performs an operation pertaining to an AP for which a start-up instruction has been issued (Step S315).

In the case when the control unit 102 determines that tampering has been detected, i.e. a notice of detection of tampering is received ("YES" in Step S310), the control unit 102 ends an operation pertaining to an AP for which a start-up instruction has been issued (Step S320).

1.9 Operation of Tamper Detection Process

Figure 14:
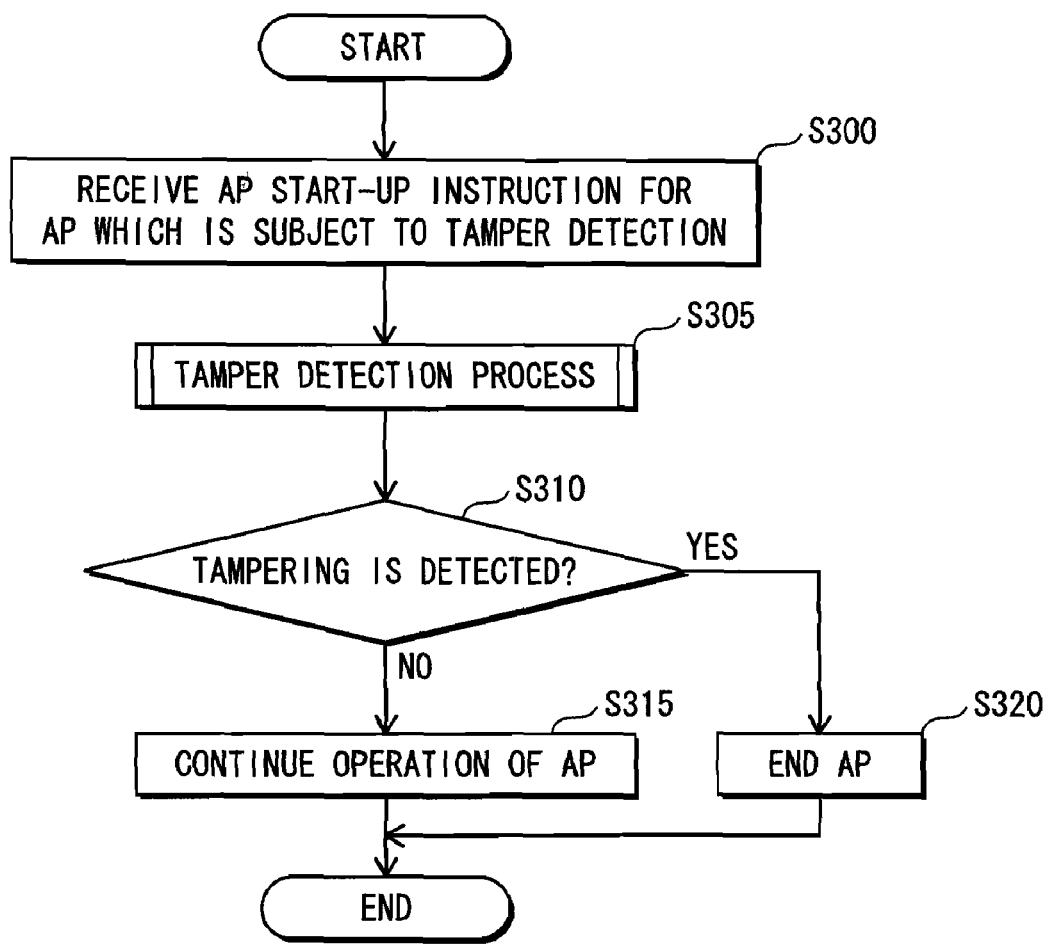
FIG. 14 is a flowchart showing an operation performed in the mobile telephone 10 at AP start-up.

Here, the operation of the tamper detection process shown respectively in Step S240 of FIG. 12 and Step S305 of FIG. 14 is described with reference to a flowchart of FIGS. 15 and 16.

When receiving a detection start order and AP identification information from either the control unit 102 or the update control unit 162 of the update process unit 103, the detection control unit 171 outputs the received detection start order and AP identification information to the tamper detection calling unit 172.

The tamper detection calling unit 172 reads, when the detection start order and AP identification information from the detection control unit 171, the hash list 122 corresponding to AP identification information received from the storage unit 101 (Step S400).

The tamper detection calling unit 172 outputs the read hash list 122 and the received detection start order and AP identification information to the tamper detection process unit 173. When receiving the hash list 122, detection start order and AP identification information from the tamper detection calling unit 172, the tamper detection process unit 173 reads the partial key 123 corresponding to the received AP identification information from the storage unit 101. The tamper detection process unit 173 calculates a tamper detection key using the read partial key 123, the master key 176 and a specific algorithm (Step S405).

The tamper detection process unit 173 calculates a hash value for the data part of the received hash list using the calculated tamper detection key and a hash calculation algorithm (Step S410). The tamper detection process unit 173 judges whether the calculated hash value and the data part hash value included in the header part of the hash list match each other (Step S415).

When determining that they do not match ("NO" in Step S415), the tamper detection process unit 173 outputs a notice of detection of tampering to the detection control unit 171. The detection control unit 171 receives, from the tamper detection process unit 173, either a nontampering notice or a notice of detection of tampering. The detection control unit 171 outputs the received notice to a calling source (i.e. an output source of the detection start order and the AP identification information—either one of the control unit 102 or the update control unit 162 of the update process unit 103 (Step S420).

When determining that they match each other ("YES" in Step S415), the tamper detection process unit 173 decrypts the data part using the tamper detection key (Step S425). Note that, for the decryption, a decryption algorithm corresponding to the algorithm used to encrypt the data part 131 is used.

The tamper detection process unit 173 reads an unread hash information piece from the decrypted data part (Step S430).

The tamper detection process unit 173 outputs a file information piece included in the read hash information piece to the file reading unit 174. When receiving a file information piece from the tamper detection process unit 173, the file reading unit 174 reads a target file for tamper detection from the storage unit 101 based on the file name included in the received file information piece (Step S435).

The file reading unit 174 stores the read file in the file storage area, and outputs a file reading completion notice to the tamper detection process unit 173. The tamper detection process unit 173 receives, from the file reading unit 174, a file reading completion notice indicating that file reading has been completed.

The tamper detection process unit 173 obtains an unread entry from the read hash information piece (Step S440) and judges whether the obtained entry is the last entry (Step S445).

In the case of determining that it is not the last entry ("NO" in Step S445), the tamper detection process unit 173 reads the offset and size included in the obtained entry, and obtains a block subject to tamper detection from the file read by the file reading unit 174 based on the read offset and size (Step S450). The tamper detection process unit 173 calculates a detection hash value for the obtained block using the calculated tamper detection key and a hash calculation algorithm (Step S455). The tamper detection process unit 173 judges whether the calculated detection hash value and a hash value included in the obtained entry match each other (Step S460). When determining that they match each other ("YES" in Step S460), the tamper detection process unit 173 returns to Step S440. When determining that they do not match ("NO" in Step S460), the tamper detection process unit 173 returns to Step S420.

When determining that the obtained entry is the last entry ("YES" in Step S445), the tamper detection process unit 173 judges whether an unread hash information piece is present (Step S465). When determining that it is present ("YES" in Step S465), the tamper detection process unit 173 returns to Step S430. When determining that it is not present ("NO" in Step S465), the tamper detection process unit 173 outputs a nontampering notice to the detection control unit 171. The detection control unit 171 receives the nontampering notice from the tamper detection process unit 173. The detection control unit 171 outputs the received notice to a calling source (i.e. an output source of the detection start order and the AP identification information)—either one of the control unit 102 or the update control unit 162 of the update process unit 103 (Step S470).

1.10 Operation at Start-Up of Mobile Telephone 10

Here described are operations of the update process and tamper detection process at the start-up of the mobile telephone 10.

When the mobile telephone 10 is powered on and a power supply is started, the update control unit 162 checks the flag value stored in the flag storage unit 161.

When the flag value is "0", the mobile telephone 10 determines that the previous update process was completed and does not perform the update process and tamper detection process.

When the flag value is "1", the update control unit 162 determines that an update process is in progress and then sets interrupt inhibition to the control unit 102. The update control unit 162 outputs a restart order indicating a restart of an update process to the update data reading unit 163.

When receiving a restart order from the update control unit 162, the update data reading unit 163 outputs the received restart order to the update file receiving unit 104.

When receiving a restart order from the update data reading unit 163, the update file receiving unit 104 judges whether AP identification information stored in the AP identification information storage area is present. When determining that the AP identification is present, the mobile telephone 10 performs an operation of Step S115 onwards shown in FIG. 11.

When determining that no AP identification information is present in the AP identification information storage area, the update file receiving unit 104 judges whether the update data list is stored in the list storage area.

When determining that the update data list is present, the update file receiving unit 104 outputs a receiving completion notice to the update process unit 103. The update data reading unit 163 of the update process unit 103 receives the receiving completion notice from the update file receiving unit 104. The update process unit 103 performs an operation of Step S205 onwards shown in FIG. 12.

When determining that the update data list is not present, the update file receiving unit 104 outputs a no-restart requiring notice to the update data reading unit 163. When receiving the no-restart requiring notice, the update data reading unit 163 outputs the received no-restart requiring notice to the update control unit 162. When receiving a no-restart requiring notice indicating that a restart of an update process is not necessary from the update data reading unit 163, the update control unit 162 terminates the interrupt inhibition having been set to the control unit 102, and sets the flag value stored in the flag storage unit 161 to "0".

2. Relationship Between Detection Key and Each Operation

Figure 17:
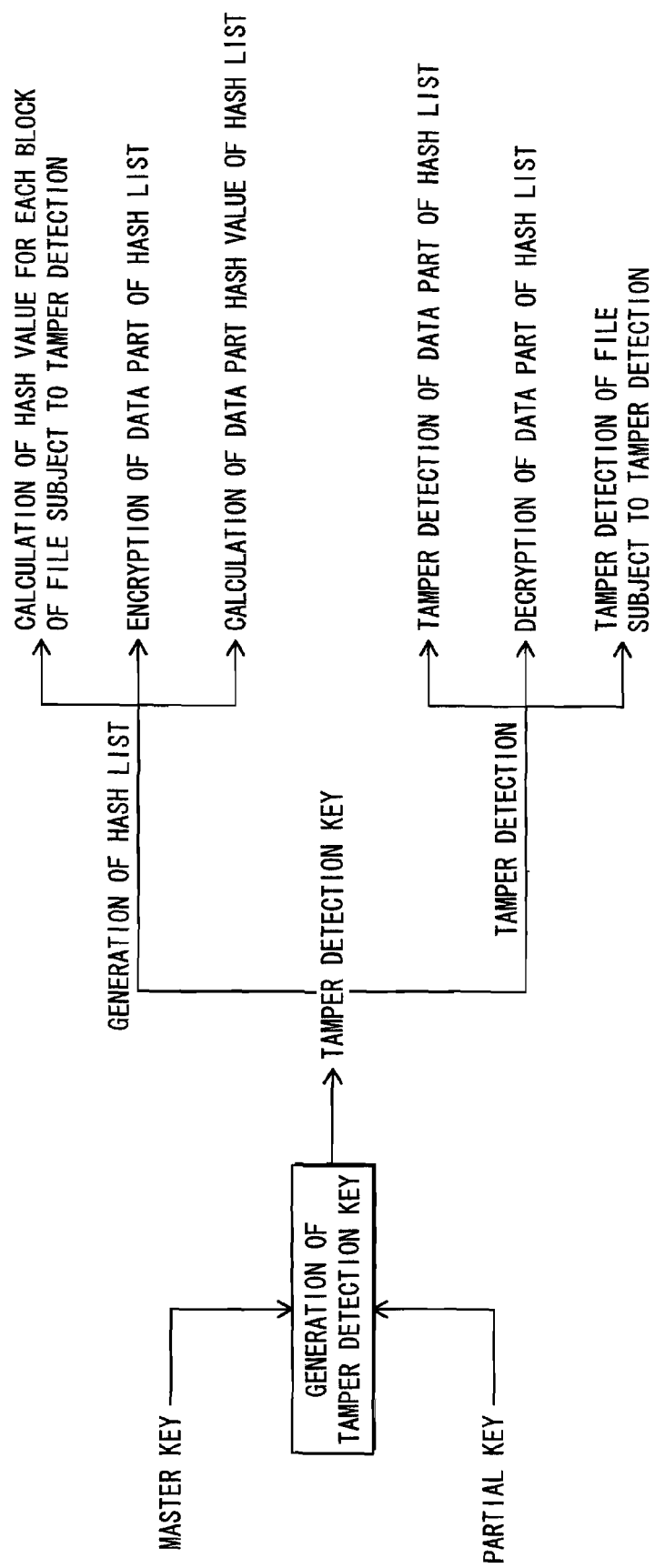
FIG. 17 shows a relationship between keys used in a first embodiment and situations in which the keys are used.

FIG. 17 shows a relationship between each key used in the present embodiment and situation in which the key is used.

The tamper detection key is generated from a calculation using a master key, a partial key and a specific algorithm. This generation operation is performed by the tamper detection key generation unit 302 of the key update apparatus 30 and the mobile telephone 10 in Step S405 shown in FIG. 15.

The generated tamper detection key is used in the generation of a hash list and the tamper detection process using a hash list as described below.

(In Hash List Generation)

The tamper detection key is used to calculate a hash value for each of one or more blocks of a file subject to tamper detection. Specifically speaking, this corresponds to the operation of Step S20 in FIG. 10.

In addition, the tamper detection key is also used to encrypt the data part of a hash list. Specifically speaking, this corresponds to the operation of Step S25 in FIG. 10.

Furthermore, the tamper detection key is also used to calculate a hash value of the data part (data part hash value) of a hash list. The calculated hash value is embedded in the header part of the hash list. Specifically speaking, this corresponds to the operation of Step S30 in FIG. 10.

(In Tamper Detection Process)

The tamper detection key is used to calculate a hash value of the data part of a hash list. Specifically speaking, this corresponds to the operation of Step S410 in FIG. 15. At this point, the mobile telephone 10 detects tampering by comparing the calculated hash value and the pre-embedded hash value (data part hash value).

In addition, the tamper detection key is used to decrypt the data part of a hash list. Specifically speaking, this corresponds to the operation of S425 in FIG. 15.

Furthermore, the tamper detection key is used to calculate a hash value (detection hash value) for each block of a file subject to tamper detection. Specifically speaking, this corresponds to the operation of Step S455 in FIG. 16. At this point, the mobile telephone 10 detects tampering by comparing the calculated detection hash value and the pre-stored hash value.

3. Modifications

Although the present invention has been described based on the above embodiment, it is a matter of course that the present invention is not confined to the embodiment. The following cases are also within the scope of the present invention.

(1) In Embodiment 1 above, a mobile telephone is used as the apparatus for tamper detection; however, the present invention is not limited to this case.

An apparatus for tamper detection may be an HDD recorder, a DVD recorder, a game apparatus or a PDA, with a communication function. That is, it only has to be an electronic device connectable to the update server apparatus via a network or the like.

(2) Regarding encryption of the data part of the hash list, in view of security strength, the entire data part may be set as the unit for encryption of the data part 131, and an algorithm using a chaining mode of a common key cryptosystem may be applied to the entire data part. In this case, the unit of update of the hash list is the entire hash list.

Figure 18:
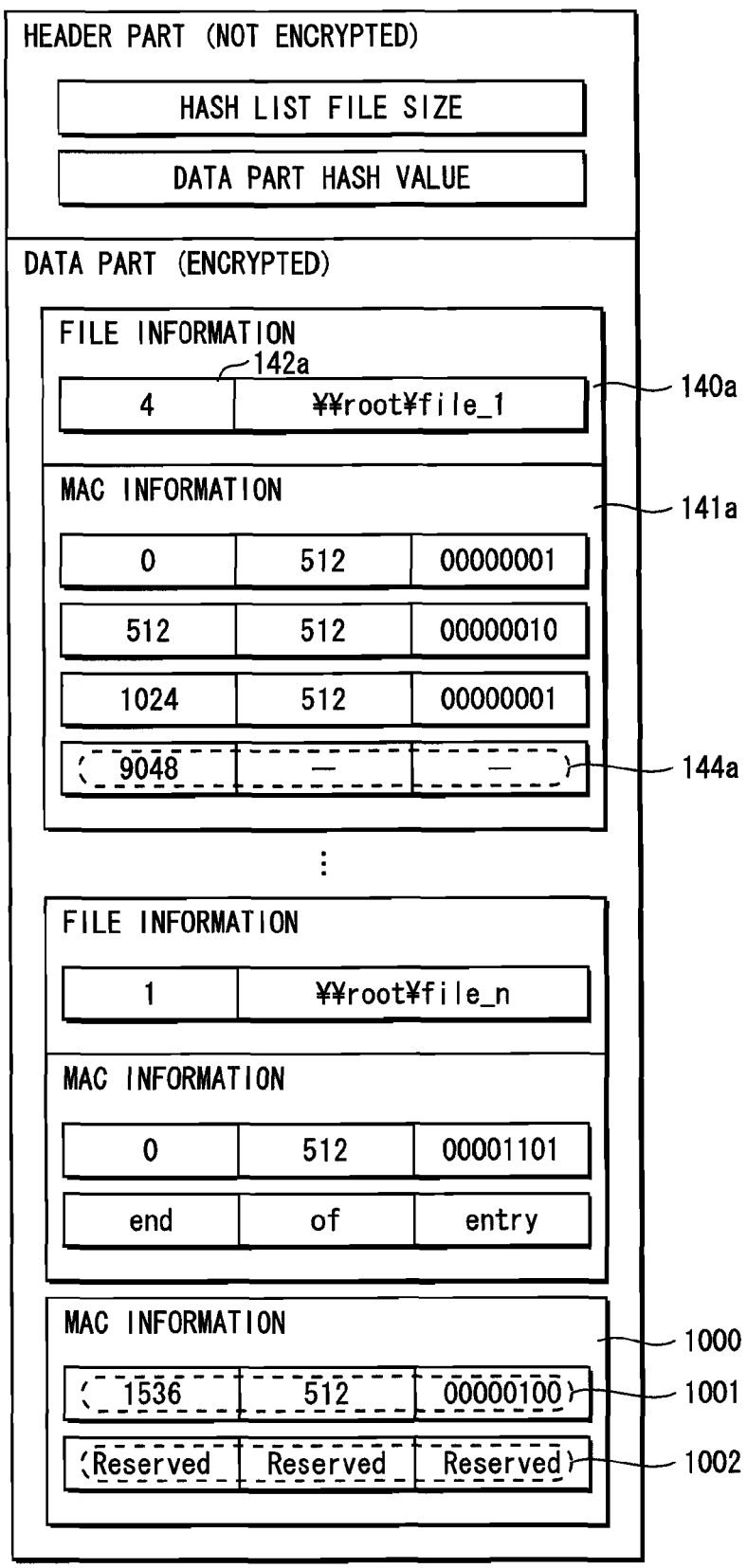

(3) In Embodiment 1 above, if the number of entries of a preupdate MAC information piece increases at updating of the hash list as a result of an increase in the size of a file subject to tamper detection, the update server apparatus may generate a hash list 122a shown in FIG. 18. In FIG. 18, the last entry of an MAC information piece 141a corresponding to a file information piece 140a is a link entry 144a indicating an address of an entry 1001 included in an MAC information piece 1000. A normal entry and a link entry differ in size and hash. Not a numerical value, but "-" is stored in a link entry. Herewith, a link entry can be distinguished from a normal entry.

In terms of an offset of the link entry 144a, an offset from the file in the hash list is stored as a value indicating the address of the entry 1001.

In this case, a block number 142a included in the file information piece 140a is "4" that is the number of the entries excluding the link entry 144a of the MAC information piece 141a and an empty entry 1002 (the last entry) of the MAC information piece 1000.

The following describes one example of how to generate a hash list in this case.

The hash list generation process unit 212 reads the tamper detection key 215. Then using the tamper detection key 215, the hash list generation process unit 212 decrypts the data part of the old hash list to generate a decrypted old hash list. Hereinafter, the decrypted old hash list is referred to as the decrypted hash list.

For the one or more update files received from the data receiving unit 211, the hash list generation process unit 212 calculates a hash value with respect to each divided block with a predetermined size by applying the same hash calculation algorithm as that of the tamper detection process unit 173 and reads a file path within the mobile telephone 10 from the target path list. Then, the hash list generation process unit 212 compares the file path and the decrypted hash list, and generates a hash list whose data part is not encrypted. In this case, if the file update is performed in a manner that the size of the generated hash list becomes larger than that of the decrypted hash list, the hash list generation process 212 converts the generated hash list into a hash list using a link entry like one shown in FIG. 18.

(4) In Embodiment 1 above, the tamper detection process unit 173 and the file reading unit 174 of the tamper detection executing unit 105 are formed from separate components; however, the present invention is not limited to this case.

The tamper detection process unit 173 and the file reading unit 174 are formed from one structural component.

(5) In Embodiment 1 above, at the time of file update, each detection target information group including a specified AP is a target for the update; however, the present invention is not limited to this case.

With one update instruction, all the detection target information groups may be made to be targets for the update.

(6) In Embodiment 1 above, the AP related file is updated using only the update data list; however, the present invention is not limited to this case.

The update server apparatus may transmit one or more update files to be updated to the mobile telephone together with an update data list. In this case, the update data list to be transmitted is composed of only update information pieces pertaining to the hash list.

(7) In Embodiment 1 above, a file subject to tamper detection is divided into blocks each having a predetermined size; however, the present invention is not limited to this case.

The update server apparatus may be designed to receive a value for the size of dividing blocks from the user. Herewith, the size of blocks can be flexibly set.

(8) In Embodiment 1 above, the update server apparatus performs calculation of the data part hash value after the encryption of the data part; however, the present invention is not limited to this case.

The update server apparatus may perform the calculation of the data part hash value prior to the encryption of the data part.

In this case, when tamper detection is performed, a hash value for the data part is calculated after decryption of the data part, and then the tamper detection is performed on the hash list.

(9) In Embodiment 1 above, the key used for encryption of the data part of the hash list and the key used for the hash calculation are the same (tamper detection key); however, they are not necessarily the same.

(10) In Embodiment 1 above, the update data list includes update contents of the update files and the updated partial key as well as update contents of the hash list; however, the present invention is not limited to this case.

The update data list may be divided into an update data list for the hash list, an update data list for the update files and an update data list for the partial key.

(11) In Embodiment 1 above, the update of the hash list is performed in response to a request from the user of the mobile telephone; however, it may be a compulsory update made by the update server apparatus.

For example, in the case when a new tamper detection key is embedded in the update server apparatus by the key update apparatus, the update server apparatus generates an update data list to transmit the updated partial key to the mobile telephone, and immediately transmits the generated update data list to the mobile telephone.

(12) In Embodiment 1 above, another mobile telephone may have the same master key as that of the mobile telephone 10, or may have a different master key.

In the case when mobile phones have different master keys, the key update apparatus manages multiple master keys. Since tamper detection keys calculated from updated partial keys are also different, the update server apparatus also manages multiple tamper detection keys.

Figure 19:
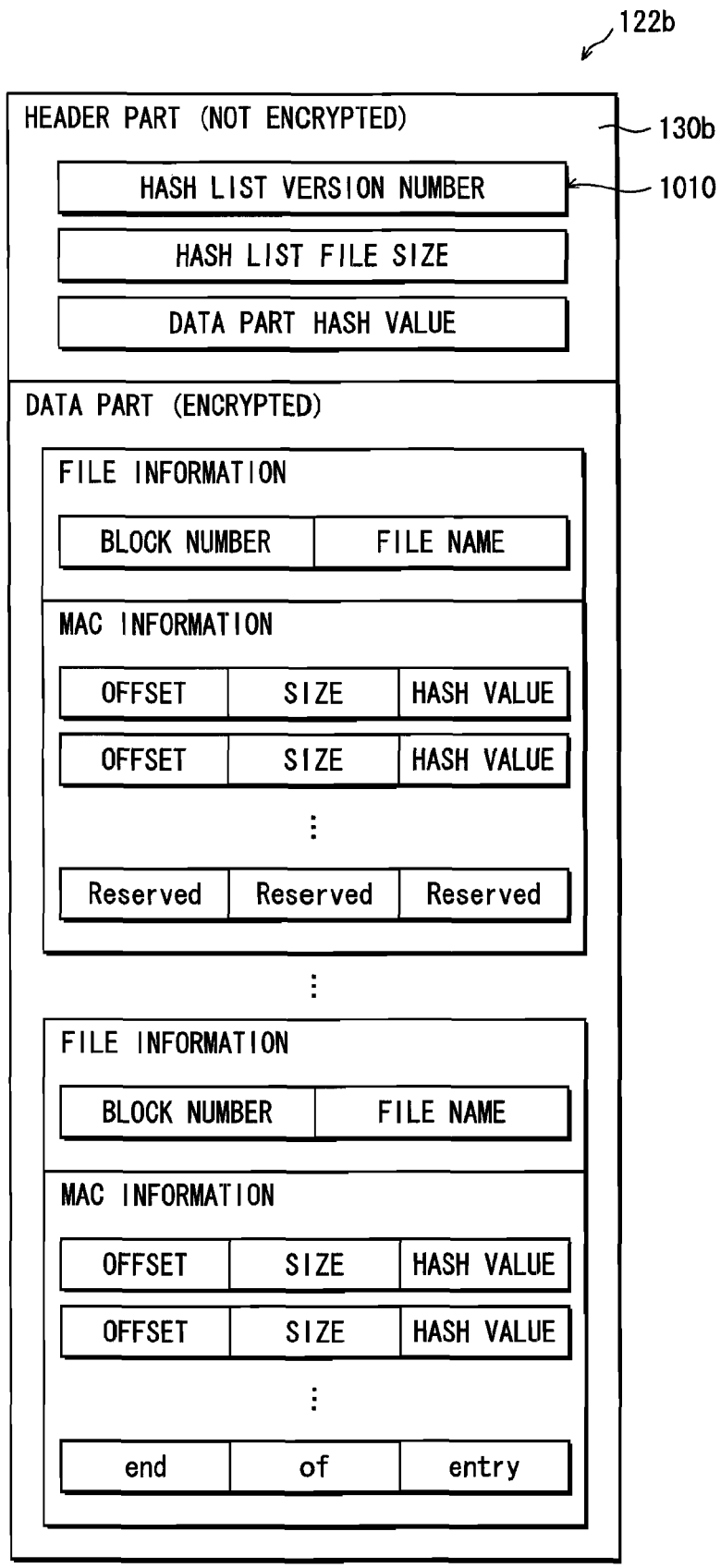
FIG. 19 shows an example of a data structure of a hash list 122b.

(13) The hash list of Embodiment 1 above may be a hash list 122b shown in FIG. 19. The hash list 122b of FIG. 19 has, in a header part 130b, a hash list version number 1010 which indicates the version status of the hash list.

In this case, when transmitting update request information to the update server apparatus, the mobile telephone also transmits the hash list version number 1010.

The update server apparatus manages an update data list with respect to each hash list version number of a generated hash list, and transmits, to the mobile telephone, an update data list corresponding to the hash list version number 1010 received from the mobile telephone.

(14) According to Embodiment 1 above, in the tamper detection process, tamper detection is performed using all entries of MAC information pieces included in the hash list; however, the present invention is not limited to this case.

In the case where a faster speed is required, a procedure may be adopted in which only an entry whose offset is "0" is checked for each MAC information piece. Alternatively, a procedure may be adopted in which the block number of file information pieces is read and then blocks of half the block number are checked.

That is, the procedure of the tamper detection process is sufficient enough if one or more entries are checked for each MAC information piece in the procedure.

(15) In Embodiment 1 above, the tamper detection is performed at the time of updating the hash list and start-up of an AP subject to tamper detection; however, the present invention is not limited to this case.

The tamper detection may be performed during start-up of the mobile telephone, or may be performed in the background when an AP subject to tamper detection is being executed.

Alternatively, the mobile telephone may periodically perform tamper detection during start-up of the mobile telephone, or may periodically perform tamper detection on an AP subject to the tamper detection when the AP is being started up.

Figure 15:
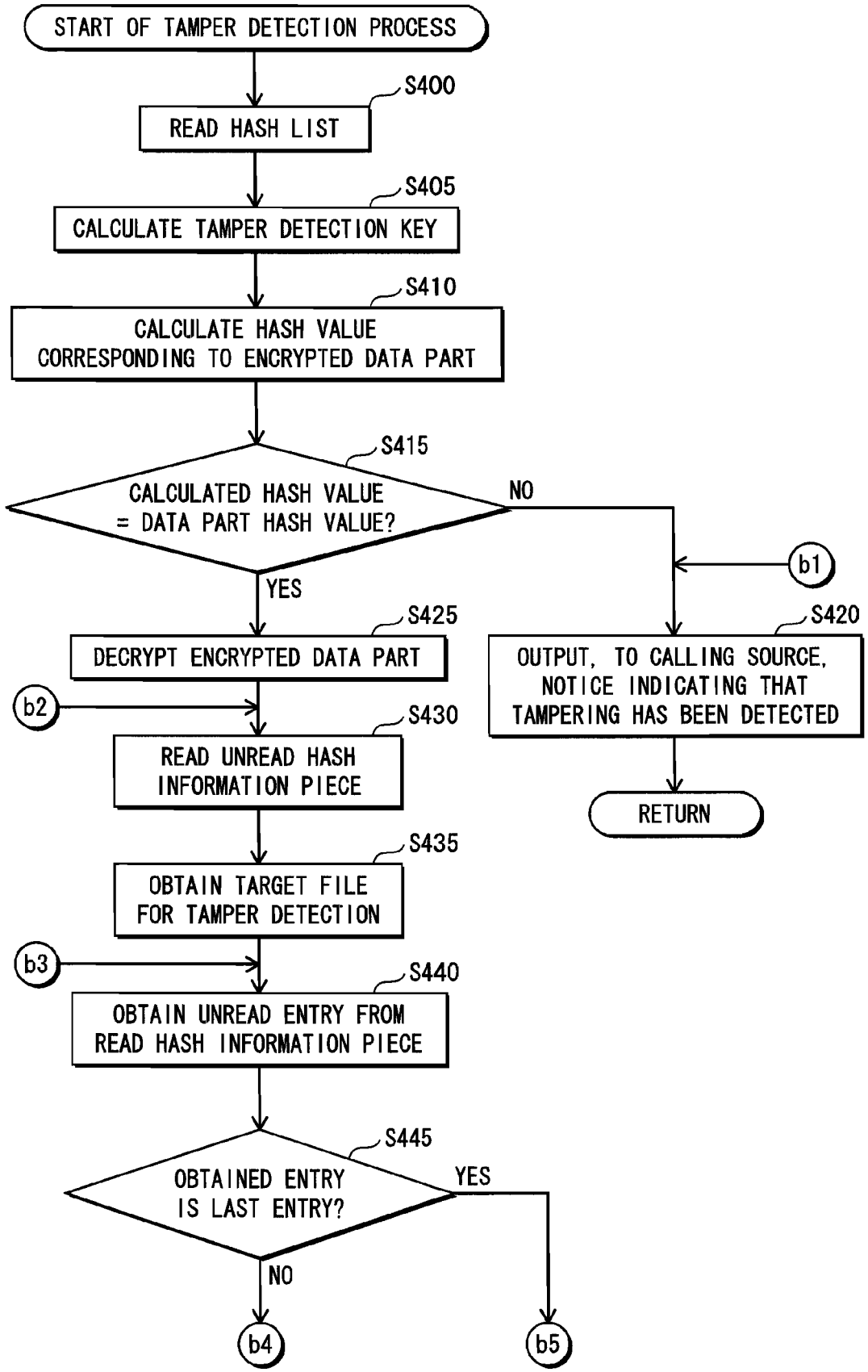
FIG. 15 is a flowchart showing an operation of a tamper detection process performed by the mobile telephone 10, continuing to FIG. 16.
Figure 16:
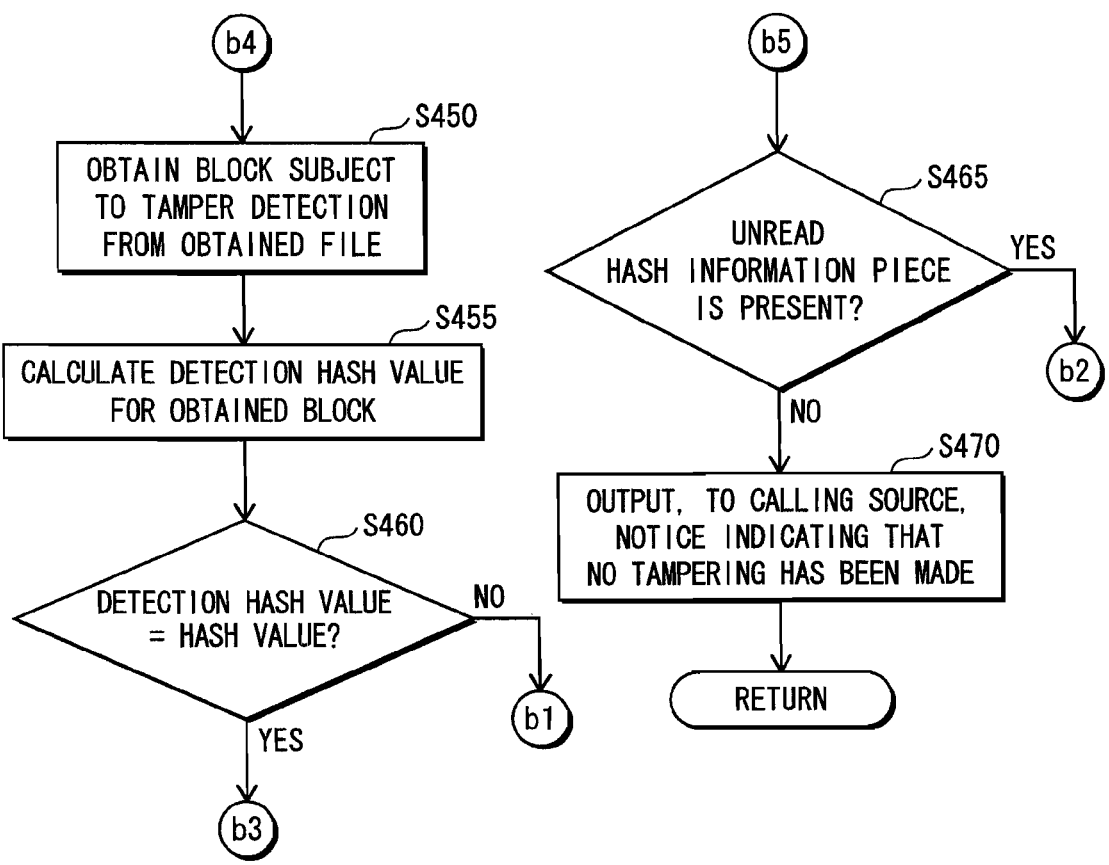
FIG. 16 is a flowchart showing the operation of the tamper detection process performed by the mobile telephone 10, continued from FIG. 15.

(16) In Step S425 of FIG. 15, the mobile telephone decrypts the entire data part; however, the present invention is not limited to this case.

The mobile telephone may conduct decryption on the basis of each entry of an MAC information piece.

In this case, after performing Step S415 of FIG. 15, the mobile telephone performs Steps S430 to S440, omitting Step S425. At this point, the read entries have been encrypted. The mobile telephone subsequently decrypts the read entries and performs Step S445 onwards. Alternatively, the mobile telephone may perform Step S415 of FIG. 15, then omit Step S425, perform Steps S430 to S445, and subsequently conduct the decryption.

(17) According to Embodiment 1 above, if the size of a file subject to tamper detection becomes small at the time of updating the hash list, the size included in an unnecessary entry is set to "0".

Figure 20:
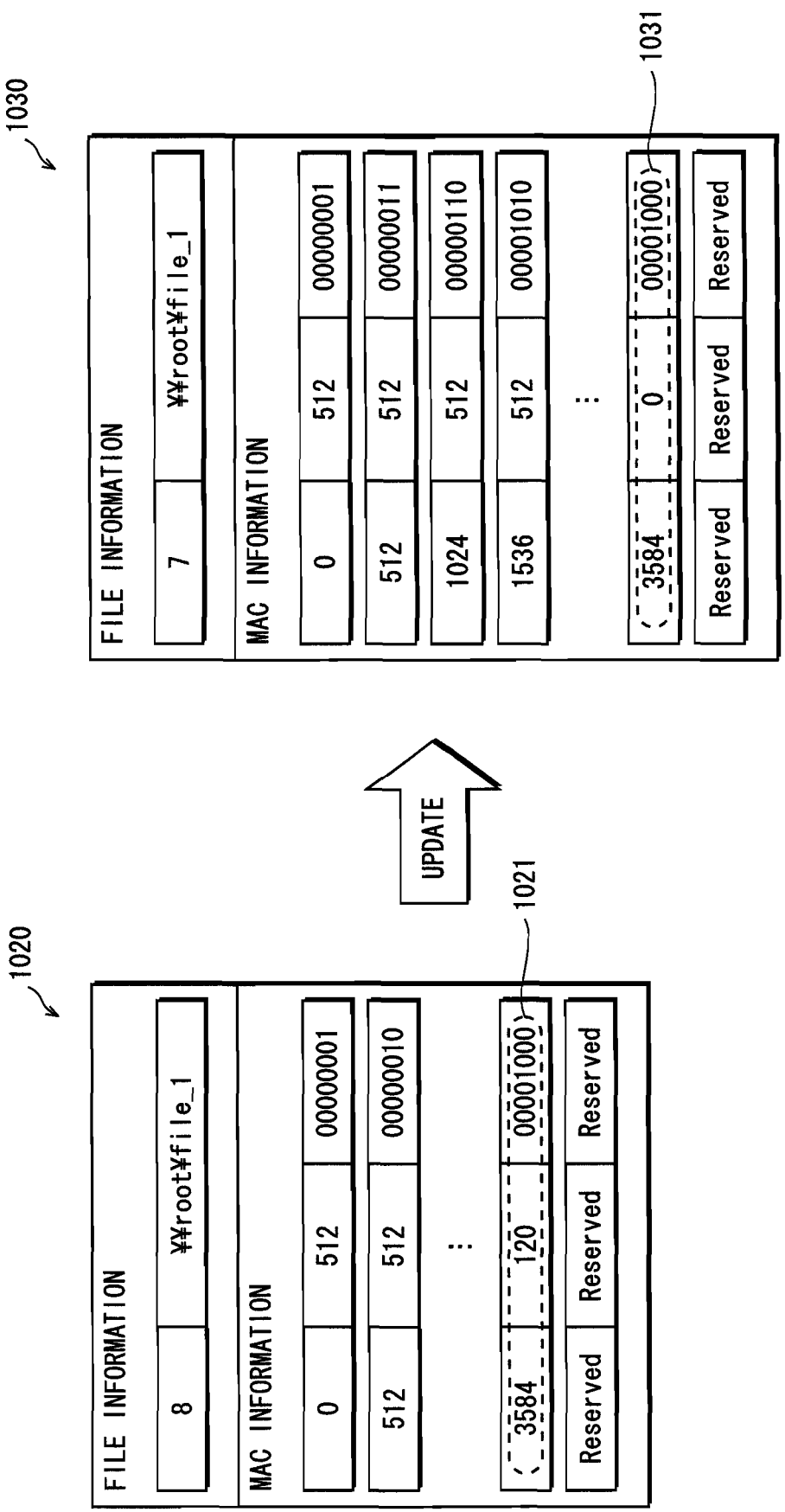
FIG. 20 shows an example of hash information piece 1030 in which the number of blocks of a file has decreased to "7" from "8"

FIG. 20 is an example showing the case in which the block number of a file is reduced from "8" to "7".

In this case, in a preupdate hash information piece 1020, 120 is stored as the size included in an entry 1021 of an $8^{th}$ block. When the block number is reduced from "8" to "7" as a result of the file update, a hash information piece 1030 is generated in which the size included in an entry 1031 of the $8^{th}$ block is "0". It is a matter of course that, in this case, the entry 1031 is subject to updating.

When performing tamper detection, the mobile telephone ignores an entry if the size included in the entry is "0" and does not check the entry for tampering.

Note that the hash value included in the entry 1031 is here a value before the update; however, the hash value may be "0".

In this case, the mobile telephone is able to use a value stored in the size as judgment information for judging whether an entry including the size is subject to tamper detection. That is, the mobile telephone determines that it is not subject to tamper detection when the value is "0", and determines that it is subject to tamper detection if the value is other than "0".

(18) With two mobile telephones (here, mobile telephones 11 and 12), when the mobile telephone 11 has a $1^{st}$ AP including a function A (e.g. a function of playing back audio data) and a $2^{nd}$ AP including a function B (e.g. an SD-Binging function for encrypting a content and storing it in an SD card) and the mobile telephone 12 has an integrated AP including both the functions A and B, a different hash list for each AP may be provided as described in Embodiment 1 above. Alternatively, one hash list may be provided as described below.

Figure 21:
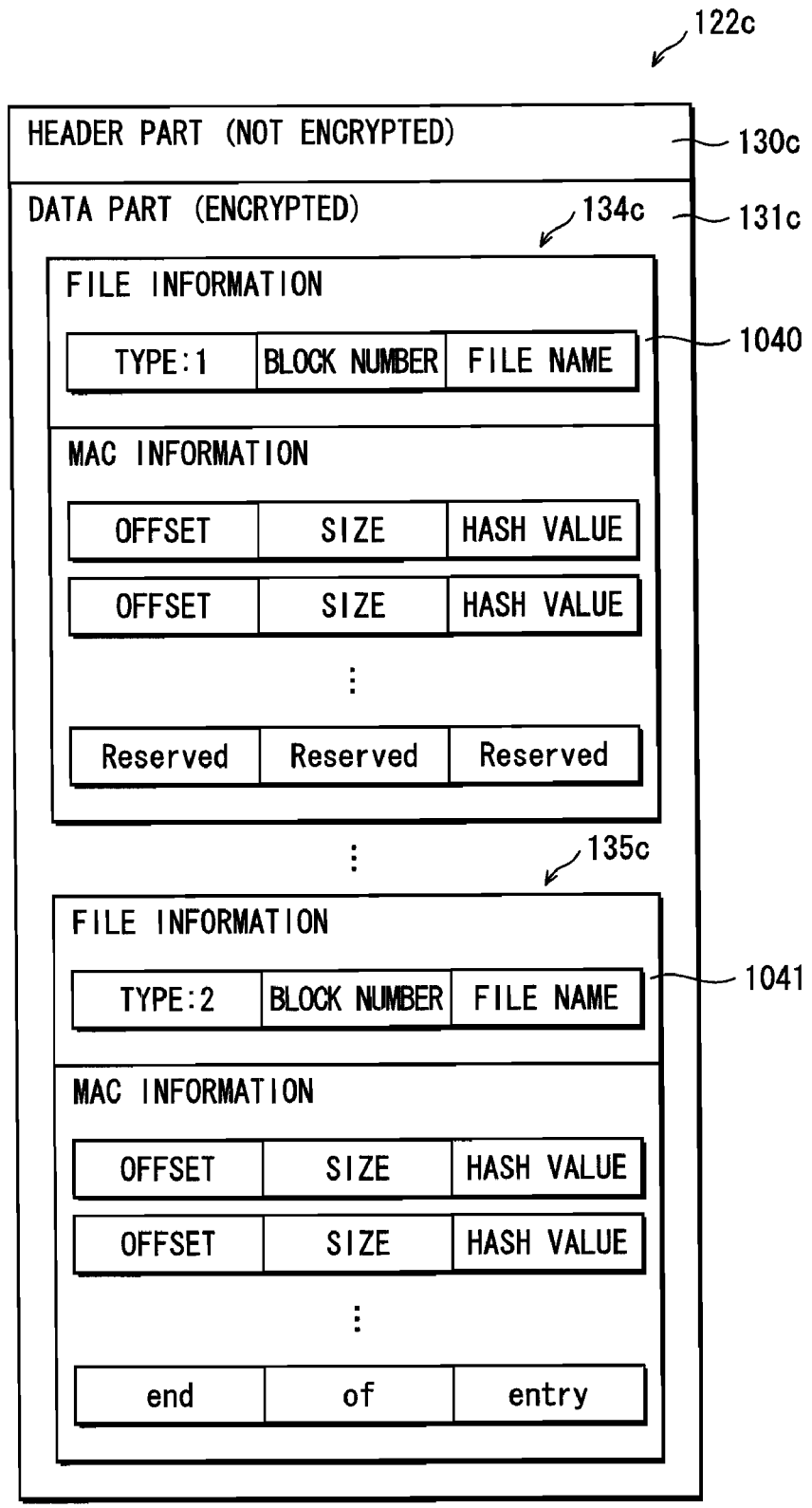
FIG. 21 is an example of a data structure of a hash list 122c.

FIG. 21 is an example showing a data structure of one hash list 122c provided for the $1^{st}$ AP, $2^{nd}$ AP and integrated AP. Since the data structure of the header part 130c is the same as that of the header part 130 of the hash list 122 of Embodiment 1, the explanation is omitted here.

The hash list 122c differs from the hash list 122 of Embodiment 1 in that types are added to the file information pieces. The types are for identifying hash information pieces used in the execution of tamper detection, and include, for example, numerical values 1, 2, . . . , and ALL. ALL being set as the type means that all hash information pieces included in the hash list are used for tamper detection. A numerical value being set as the type means that a hash information piece having a file information piece including the set type (numerical value) is subject to tamper detection.

In this case, each AP (the $1^{st}$ AP, $2^{nd}$ AP and integrated AP) stores therein its type, and sends the stored type to the tamper detection executing unit at the time of starting-up. Here, assume that the types 1, 2 and ALL are set in the $1^{st}$ AP, the $2^{nd}$ AP and the integrated AP, respectively.

When the $1^{st}$ AP is started on the mobile telephone 11, a hash information piece 134c having a file information piece 1040 including the type "1" becomes subject to tamper detection, as shown in FIG. 21.

Also when the $2^{nd}$ AP is started on the mobile telephone 11, a hash information piece 135c having a file information piece 1041 including the type "2" becomes subject to tamper detection.

When the integrated AP is started on the mobile telephone 12, all hash information pieces included in the data part 131c become subject to tamper detection since the integrated AP stores therein the type "ALL".

(19) Regarding the hash list according to Embodiment 1 above, priority ordering for performing tamper detection may be provided to one or more files subject to the tamper detection. In this case, for example, the tamper detection is performed preferentially on files having a higher priority at the time of the AP start-up; for other files subject to tamper detection, the tamper detection is performed in the background during some function of the AP being run after the AP start-up is completed.

Figure 22:
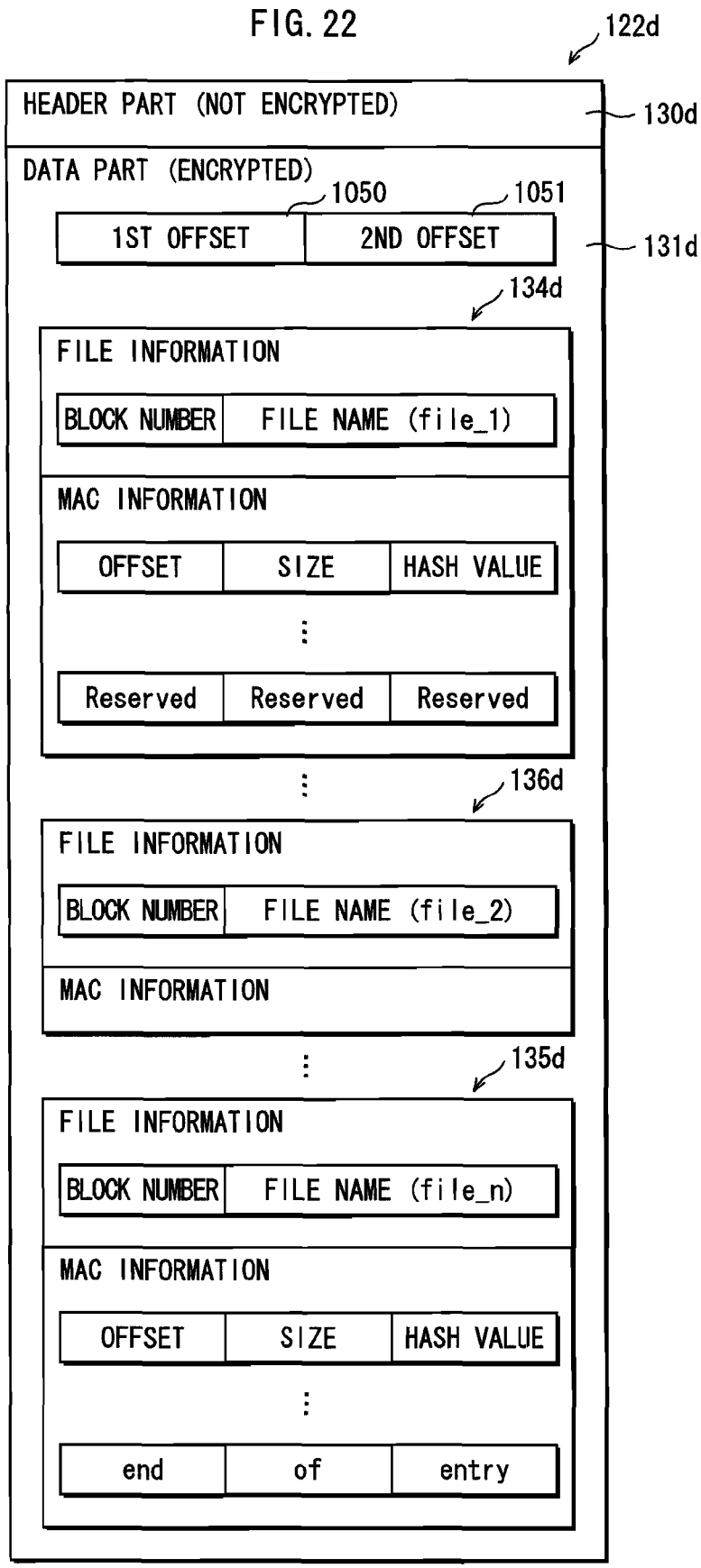
FIG. 22 is an example of a data structure of a hash list 122d.

FIG. 22 is one example showing a data structure of a hash list 122d with priority ordering. Since the data structure of a header part 130d is the same as that of the header part 130 of the hash list 122 of Embodiment 1, the explanation is omitted here.

The hash list 122d differs from the hash list 122 of Embodiment 1 in that a pair of a $1^{st}$ offset 1050 and a $2^{nd}$ offset 1051 is added to the data part 131d.

The $1^{st}$ offset is an offset value indicating the starting location of a hash information piece on which tamper detection is to be preferentially performed; the $2^{nd}$ offset is an offset value indicating the end location of a hash information piece on which tamper detection is to be preferentially performed.

For example, in the case where an offset value indicating the starting location of a hash information piece 134d is stored in the $1^{st}$ offset and an offset value indicating the end location of the hash information piece 134d is stored in the $2^{nd}$ offset, the tamper detection on a file having a file name "file_1" is performed at the time of the AP start-up while the tamper detection on the remaining files is performed in the background during the AP operation.

In the case where an offset value indicating the starting location of the hash information piece 134d is stored in the $1^{st}$ offset and an offset value indicating the end location of a hash information piece 136d is stored in the $2^{nd}$ offset, the tamper detection on files respectively having a file name "file_1" and a file name "file_2" is performed at the time of the AP start-up while the tamper detection on the remaining files is performed in the background during the AP operation.

(20) In Embodiment 1 above, one hash list is provided to one AP file group, i.e. one AP; however, the present invention is not limited to this case.

One hash list and a partial key may be given to one or more AP file groups.

Figure 23:
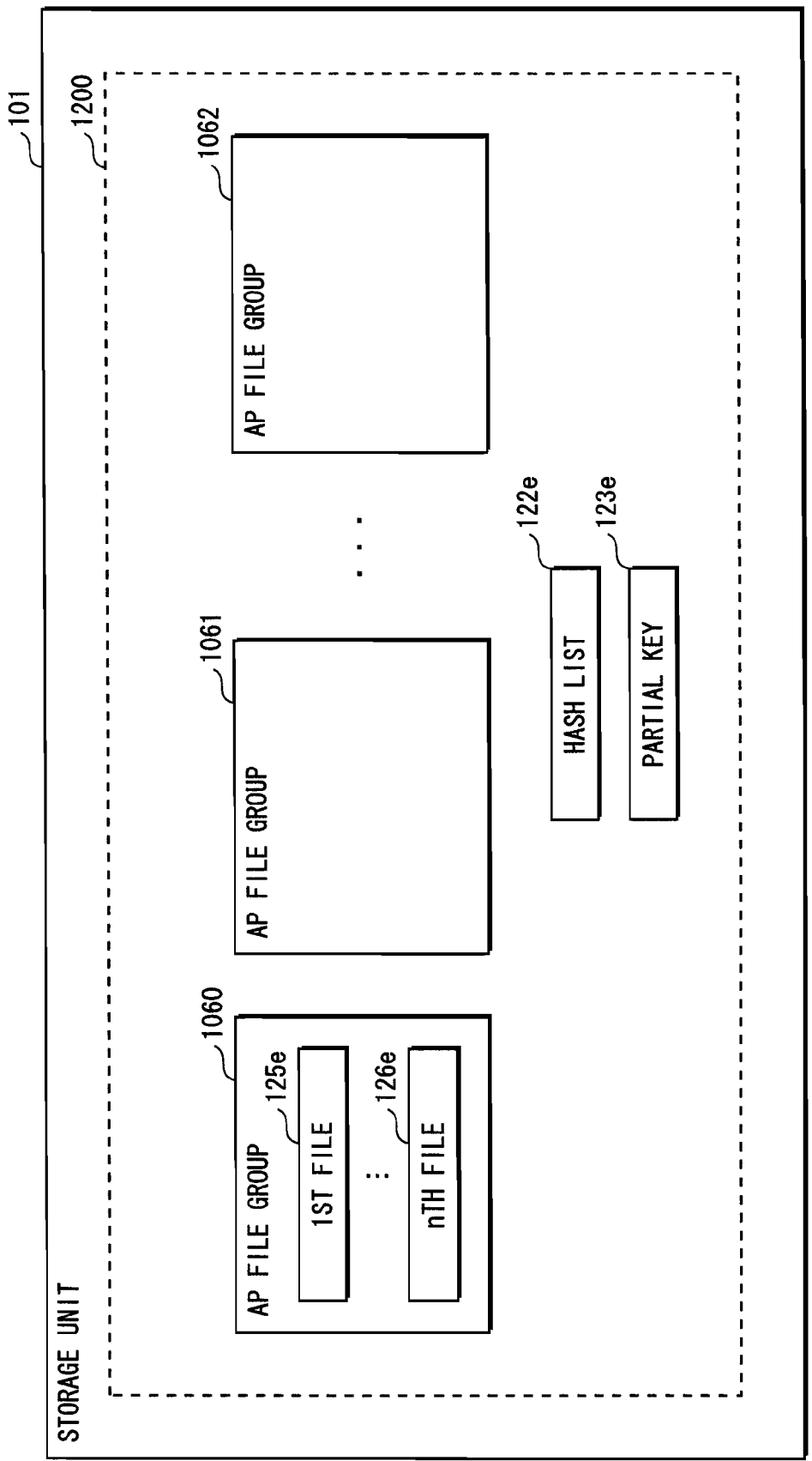
FIG. 23 is a block diagram showing a structure of a storage unit 101 employed when one hash list and a partial key are provided for one or more AP file groups.

FIG. 23 shows the structure of the storage unit 101 in such a case.

In FIG. 23, the storage unit 101 has one detection target information group 1200.

The detection target information group 1200 includes one or more AP file groups 1060, 1061, ..., 1062, a hash list 122e, and a partial key 123e.

The data part of the hash list 122e includes hash information pieces corresponding to respective files included in the AP file groups 1060, 1061, ..., 1062.

In the case when one AP included in the detection target information group 1200 is started up, the mobile telephone may set all files included in the detection target information group 1200 to be subject to tamper detection, or may set only the started AP's one or more files to be subject to tamper detection.

(21) In Embodiment 1 above, the update control unit 162 checks the flag value when the mobile telephone 10 is powered on, and automatically restarts a file update when the flag value is "1"; however, the present invention is not limited to this case.

When the update control unit 162 determines that the flag value is "1", the mobile telephone 10 may issue an inquiry of whether to restart the file update, and restart it when receiving an affirmative instruction from the user.

Alternatively, in the case when the file update is to be automatically restarted, the restart of the file update may be notified to the user.

Or the update control unit 162 may check the flag value when the mobile telephone 10 is powered on, and update only unupdated data when the flag value is "1". That is, the mobile telephone 10 may restart the update operation from the middle (i.e. from a point which was in operation when the mobile telephone 10 was powered off).

(22) In Embodiment 1 above, the data part of the hash list is encrypted; however, the present invention is not limited to this.

The data part does not have to be encrypted.

(23) An application file of the present invention may be: application software itself; an encoder, a decoder, or a driver called from application software; or a virtual execution environment, like Java (registered trademark) VM that provides an environment in which application software operates. In addition, a partial key may be included in the concept of the application file.

(24) In Embodiment 1 above, the key update apparatus obtains an updated partial key from an external apparatus; however, the present invention is not limited to this case.

The key update apparatus itself may generate a new partial key.

In addition, the master key may be stored in the key update apparatus, or may be obtained from an external apparatus.

(25) In Embodiment 1 above, one or more update blocks for a file to be updated as well as the hash list file size, the data part hash value, the file information, and entries included in the MAC information of the hash list are stored as the update data included in the update data list; however, the present invention is not limited to this case.

Instead of one or more update blocks for a file to be updated, only updated data, such as statements for executing application software, may be stored as the update data.

In addition, a block to be updated may be included in the concept of "data" of the present invention.

(26) In Embodiment 1 above, the tamper detection is performed using a hash value as a value for tamper detection (tamper detection value); however, the present invention is not limited to this case.

A value different from a hash value, or data may be used instead. For example, a result obtained by encrypting data subject to tamper detection may be used as the tamper detection value.

(27) Specifically speaking, each apparatus above is a computer system composed of a microprocessor, ROM, RAM, a hard disk unit, a display unit, a keyboard, a mouse and the like. A computer program is stored in the RAM or the hard disk unit. The microprocessor operates according to the computer program, and thereby each apparatus fulfills its functions. Here, the computer program is structured by combining multiple instruction codes indicating commands to the computer to achieve predetermined functions.

(28) Part or all of the components making up the above individual apparatuses may be assembled as a single system LSI (Large Scale Integration). The system LSI is an ultra-multifunctional LSI produced by integrating multiple components on one chip, and more specifically, is a computer system composed of a microprocessor, ROM, RAM, and the like. A computer program is stored in the RAM. The microprocessor operates according to the computer program, and thereby the system LSI accomplishes its function.

Although referred to here as system LSI, it may be also referred to as IC, LSI, system LSI, super LSI, and ultra LSI, depending on the degree of integration.

In addition, the method for assembling integrated circuits is not limited to LSI, and a dedicated communication circuit or a general-purpose processor may be used to achieve this. A FPGA (Field Programmable Gate Array), which is programmable after the LSI is produced, or a reconfigurable processor, which allows reconfiguration of the connection and setting of circuit cells inside the LSI, may be used.

If technology for forming integrated circuits that replaces LSIs is introduced, owing to advance in semiconductor technology or different technology derived therefrom, the integration of functional blocks may naturally be accomplished using such technology. There is also a possibility of application of biotechnology to the integrated circuit technology.

(29) Each element, part or all of the components making up the above individual apparatuses may be assembled as an IC card detachable from a device, or as a single module. The IC card/module is a computer system composed of a microprocessor, ROM, RAM, and the like. The IC card/module may include therein the above-mentioned ultra-multifunctional LSI. The microprocessor operates according to a computer program, and thereby the IC card/module accomplishes its function. The IC card/module may be tamper resistant.

(30) The present invention may be a method of accomplishing the above-described system. The present invention may be a computer program that achieves the method by a computer, or may be a digital signal representing the computer program.

The present invention may also be achieved by a computer-readable recording medium, such as a flexible disk, a hard disk, a CD-ROM, an MO disk, a DVD, a DVD-ROM, a DVD-RAM, a BD (Blu-ray Disc), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(31) The present invention includes a structure in which two or more of the above embodiments and modifications are combined.

4. Conclusion

The present invention provides a tamper detection method that can be realized also in an electronic device whose programs are updatable. In addition, portions to be updated can be minimized, thus reducing the communication costs for the update. Furthermore, it is possible to offer a tamper detection method allowing tuning of the execution speed according to specifications of the electronic device.

In addition, information required to generate a key necessary for tamper detection can be managed at a location other than the update server. Accordingly, it is possible to offer a tamper detection method allowing, if by any chance a key of the electronic device is leaked, issuing and updating of the key.

INDUSTRIAL APPLICABILITY

Each apparatus making up the program update system described above can be used operationally, i.e. repeatedly and continuously, in electronic device manufacturing industries.

In addition, the tamper detection method of the present invention used for an electronic device whose programs are updatable is useful in the case where an embedded device requiring secure program execution, such as a mobile telephone, has a function for updating programs.

The invention claimed is:

1. An electronic device having an application file pertaining to an operation of application software and updating the application file via a network, comprising:
   a storage unit storing therein the application file including one or more data pieces;
   a reception unit operable to receive, from an external apparatus via the network, update data and location information indicating a location in the application file, the indicated location being for rewrite with the update data;
   an update process unit operable to rewrite only part of the application file by writing over a data piece present at the indicated location with the update data to update the application file; and
   a tamper detection execution unit operable to examine whether the updated application file has been tampered with,
   wherein the reception unit receives one or more updating sets, each of which includes the update data and the location information, wherein the update process unit includes:
      a location determining subunit operable to determine, with respect to each of the updating sets, an update location in the application file based on the indicated location;
      a write subunit operable to write, with respect to each of the updating sets, the update data in a place starting from the determined update location; and
      an update control subunit operable to control the location determining subunit and the write subunit to be in process until completion of writing of the update data included in all the sets,
   wherein the update control subunit controls the tamper detection execution unit to start a process thereof when the writing of the update data included in all the updating sets is completed,
   wherein the update process unit further includes:
      a flag storage subunit storing therein a flag showing one of $1^{st}$ information indicating that the application file is in a process of update and $2^{nd}$ information indicating that the application file is not in the process of update; and
      a flag change subunit operable to change flag information shown by the flag,
   wherein the flag change subunit changes the flag information to the $1^{st}$ information when the reception unit receives the updating sets, and changes the flag information to the $2^{nd}$ information when tampering is not detected by the tamper detection execution unit, and
   wherein the update control subunit checks the flag information when the electronic device is powered on, and in a case where the flag information is the $1^{st}$ information, the update control subunit cause the reception unit to newly receive, from the external apparatus, the update data and the location information, and the update control subunit controls the location determining subunit and the write subunit to be in process after newly receiving the update data and the location information.

2. The electronic device of claim 1,
   wherein the application file is divided into one or more blocks,
   the update data is included in one or more update blocks, each of which corresponds to a different one of the divided blocks,
   the storage unit stores therein a tamper detection list including one or more reference tamper detecting values which correspond one-to-one with the divided blocks,
   the reception unit further receives one or more update block information sets, each of which corresponds to a different one of the update blocks and includes a new reference tamper detecting value and tamper detection location information indicating a location, in the tamper detection list, at which the new reference tamper detecting value is to be written,
   the update process unit further updates the tamper detection list using the update block information sets, and
   only when the updated tamper detection list is valid, the tamper detection execution unit examines whether a block subject to tamper detection has been tampered with, based on the reference tamper detecting values in the updated tamper detection list.

3. The electronic device of claim 1,
wherein the application file is divided into one or more blocks,
the storage unit stores therein a tamper detection list including one or more reference tamper detecting values which correspond one-to-one with the divided blocks, and
the tamper detection execution unit starts a process thereof at start-up of the application software, and examines, only when the tamper detection list is valid, whether a block subject to tamper detection has been tampered with, based on at least one of the reference tamper detecting values in the tamper detection list.

4. The electronic device of claim 3,
wherein the tamper detection unit calculates a detection tamper detecting value for the block subject to the tamper detection, performs a judgment of whether the detection tamper detecting value matches a reference tamper detecting value corresponding to the block subject to the tamper detection, and determines that the updated application file has not been tampered with when the judgment is affirmative and determines that the updated application file has been tampered with when the judgment is negative.

5. The electronic device of claim 4,
wherein the storage unit stores therein a partial key, and
the tamper detection execution unit is tamper resistant, stores therein a master key, generates a tamper detection key using the partial key and the master key, and uses the generated tamper detection key to calculate the detection tamper detecting value.

6. The electronic device of claim 5,
wherein the reception unit receives a new partial key different from the partial key and key location information indicating a location, in the storage unit, at which the partial key is stored, and
the update process unit updates the partial key with the new partial key based on the key location information.

7. The electronic device of claim 3,
wherein the tamper detection list is made up of a data part including the reference tamper detecting values and a header part including a reference data-part tamper detecting value corresponding to the data part, and
the tamper detection execution unit calculates a detection data-part tamper detecting value corresponding to the data part, and determines that the tamper detection list is valid in a case where the calculated detection data-part tamper detecting value matches the reference data-part tamper detecting value.

8. The electronic device of claim 7,
wherein the data part is encrypted, and
the tamper detection execution unit calculates the detection data-part tamper detecting value corresponding to the encrypted data part, and decrypts the encrypted data part in a case where the tamper detection list is valid.

9. The electronic device of claim 3,
wherein in the tamper detection list, judgment information is associated with each of the reference tamper detecting values and indicates whether a divided block corresponding to the reference tamper detecting value is to be used as the block subject to the tamper detection, and
the tamper detection execution unit does not perform the tamper detection on the divided block in a case when the associated judgment information indicates the divided block is not to be used as the block subject to the tamper detection.

10. The electronic device of claim 3,
wherein in the tamper detection list, an application type indicating a type of application software subject to the tamper detection is associated with each of the reference tamper detecting values, and
the tamper detection execution unit examines whether the block subject to the tamper detection has been tampered with, based on one or more reference tamper detecting values associated with an application type indicating a type of the started-up application software.

11. The electronic device of claim 3, having a plurality of application files pertaining to the operation of the application software,
wherein each of the application files is divided into one or more blocks,
the tamper detection list stores therein, with respect to each of the application files, the reference tamper detecting values corresponding one-to-one with the divided blocks as a reference value group, and includes range information indicating a range of at least one reference value group among reference value groups for the respective application files, the at least one reference value group being used for the tamper detection performed at the start-up of the application software, and
the tamper detection execution unit examines whether the block subject to the tamper detection has been tampered with, using the at least one reference value group at the start-up of the application software.

12. The electronic device of claim 1,
wherein the update processing unit and the tamper detection execution unit are tamper resistant.

13. An update method used in an electronic device having an application file pertaining to an operation of application software and updating the application file via a network, wherein the electronic device includes a storage unit storing therein the application file including one or more data pieces, the update method comprising:
a reception step of receiving, using a reception unit, from an external apparatus via the network, update data and location information indicating a location in the application file, the indicated location being for rewrite with the update data;
an update process step of writing, using an update unit, over a data piece present at the indicated location with the update data to update the application file; and
a tamper detection execution step of examining, using a tamper detection unit, whether the updated application file has been tampered with,
wherein the reception step includes receiving one or more updating sets, each of which includes the update data and the location information,
wherein the update process step includes:
a location determining step of determining, with respect to each of the updating sets, an update location in the application file based on the indicated location;
a write step of writing, with respect to each of the updating sets, the update data in a place starting from the determined update location; and
an update control step of controlling the location determining step and the write step to be in process until completion of writing of the update data included in all the sets,
wherein the update control step controls the tamper detection execution step to start a process thereof when the writing of the update data included in all the updating sets is completed, wherein the update process step further includes:
  a flag storage step of storing a flag showing one of $1^{st}$ information indicating that the application file is in a process of update and $2^{nd}$ information indicating that the application file is not in the process of update; and
  a flag change step of changing flag information shown by the flag,
wherein the flag change step changes the flag information to the $1^{st}$ information when the reception step receives the updating sets, and changes the flag information to the $2^{nd}$ information when tampering is not detected by the tamper detection execution step, and
wherein the update control step checks the flag information when the electronic device is powered on, and in a case where the flag information is the $1^{st}$ information, the update control step cause the reception step to newly receive, from the external apparatus, the update data and the location information, and the update control step controls the location determining step and the write step to be in process after newly receiving the update data and the location information.

14. A non-transitory computer readable recording medium having stored thereon an update program used in an electronic device having an application file pertaining to an operation of application software and updating the application file via a network, wherein the electronic device includes a storage unit storing therein the application file including one or more data pieces, and wherein, when executed, the update program cause the electronic device to perform an update method comprising:
  a reception step of receiving, from an external apparatus via the network, update data and location information indicating a location in the application file, the indicated location being for rewrite with the update data;
  an update process step of writing over a data piece present at the indicated location with the update data to update the application file; and
  a tamper detection execution step of examining whether the updated application file has been tampered with,
wherein the reception step includes receiving one or more updating sets, each of which includes the update data and the location information,
wherein the update process step includes:
  a location determining step of determining, with respect to each of the updating sets, an update location in the application file based on the indicated location;
  a write step of writing, with respect to each of the updating sets, the update data in a place starting from the determined update location; and
  an update control step of controlling the location determining step and the write step to be in process until completion of writing of the update data included in all the sets,
wherein the update control step controls the tamper detection execution step to start a process thereof when the writing of the update data included in all the updating sets is completed,
wherein the update process step further includes:
  a flag storage step of storing a flag showing one of $1^{st}$ information indicating that the application file is in a process of update and $2^{nd}$ information indicating that the application file is not in the process of update; and
  a flag change step of changing flag information shown by the flag,
wherein the flag change step changes the flag information to the $1^{st}$ information when the reception step receives the updating sets, and changes the flag information to the $2^{nd}$ information when tampering is not detected by the tamper detection execution step, and
wherein the update control step checks the flag information when the electronic device is powered on, and in a case where the flag information is the $1^{st}$ information, the update control step cause the reception step to newly receive, from the external apparatus, the update data and the location information, and the update control step controls the location determining step and the write step to be in process after newly receiving the update data and the location information.

15. An integrated circuit of an electronic device having an application file pertaining to an operation of application software and updating the application file via a network, wherein the electronic device includes a storage unit storing therein the application file including one or more data pieces, the integrated circuit comprising:
  a reception unit operable to receive, from an external apparatus via the network, update data and location information indicating a location in the application file, the indicated location being for rewrite with the update data;
  an update process unit operable to rewrite only part of the application file by writing over a data piece present at the indicated location with the update data to update the application file; and
  a tamper detection execution unit operable to examine whether the updated application file has been tampered with,
wherein the reception unit receives one or more updating sets, each of which includes the update data and the location information,
wherein the update process unit includes:
  a location determining subunit operable to determine, with respect to each of the updating sets, an update location in the application file based on the indicated location;
  a write subunit operable to write, with respect to each of the updating sets, the update data in a place starting from the determined update location; and
  an update control subunit operable to control the location determining subunit and the write subunit to be in process until completion of writing of the update data included in all the sets,
wherein the update control subunit controls the tamper detection execution unit to start a process thereof when the writing of the update data included in all the updating sets is completed,
wherein the update process unit further includes:
  a flag storage subunit storing therein a flag showing one of $1^{st}$ information indicating that the application file is in a process of update and $2^{nd}$ information indicating that the application file is not in the process of update; and
  a flag change subunit operable to change flag information shown by the flag,
wherein the flag change subunit changes the flag information to the $1^{st}$ information when the reception unit receives the updating sets, and changes the flag information to the $2^{nd}$ information when tampering is not detected by the tamper detection execution unit, and
wherein the update control subunit checks the flag information when the electronic device is powered on, and in a case where the flag information is the $1^{st}$ information, the update control subunit cause the reception unit to newly receive, from the external apparatus, the update data and the location information, and the update control subunit controls the location determining subunit and the write subunit to be in process after newly receiving the update data and the location information.

* * * * *